US012160797B2

(12) United States Patent
Inoue et al.

(10) Patent No.: US 12,160,797 B2
(45) Date of Patent: Dec. 3, 2024

(54) UTILIZING WIRELESS DISTRIBUTION CONTENT

(71) Applicant: NIPPON TELEGRAPH AND TELEPHONE CORPORATION, Tokyo (JP)

(72) Inventors: Yasuhiko Inoue, Musashino (JP); Shoko Shinohara, Musashino (JP); Akira Kishida, Musashino (JP); Kengo Nagata, Musashino (JP); Yusuke Asai, Musashino (JP); Yasushi Takatori, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 227 days.

(21) Appl. No.: 17/790,263

(22) PCT Filed: Jan. 10, 2020

(86) PCT No.: PCT/JP2020/000667
§ 371 (c)(1),
(2) Date: Jun. 30, 2022

(87) PCT Pub. No.: WO2021/140648
PCT Pub. Date: Jul. 15, 2021

(65) Prior Publication Data
US 2023/0061186 A1    Mar. 2, 2023

(51) Int. Cl.
*H04W 4/06* (2009.01)
*H04W 84/12* (2009.01)

(52) U.S. Cl.
CPC .............. *H04W 4/06* (2013.01); *H04W 84/12* (2013.01)

(58) Field of Classification Search
CPC ....... H04W 4/06; H04W 28/06; H04W 80/02; H04W 84/12
See application file for complete search history.

(56) References Cited

U.S. PATENT DOCUMENTS

2016/0366666 A1   12/2016   Yang et al.
2017/0118783 A1*   4/2017   Hamada ................ H04W 8/005

FOREIGN PATENT DOCUMENTS

JP    2007104600 A    4/2007
JP     201119104 A    1/2011

OTHER PUBLICATIONS

IEEE Std 802.11-2016, "Figure Apr. 2025 Establishing the IEEE 802.11 association" and "11.3 STA authentication and association", Dec. 7, 2016.

* cited by examiner

*Primary Examiner* — Ian N Moore
*Assistant Examiner* — Brian T Le

(57) ABSTRACT

A base station (10) according to an embodiment includes a data processing unit (101) and a wireless signal processing unit (103). The data processing unit (101) generates a MAC frame. The MAC frame includes input data and an identification bit (CB). The identification bit (CB) indicates that data is extended broadcast data. The wireless signal processing unit (103) converts the MAC frame into a wireless signal to distribute the wireless signal.

5 Claims, 19 Drawing Sheets

RECEIVE PROGRAM TABLE

UTILIZING WIRELESS DISTRIBUTION CONTENT

CROSS-REFERENCE TO RELATED APPLICATIONS

This application is a 371 U.S. National Phase of International Application No. PCT/JP2020/000667 filed on Jan. 10, 2020. The entire disclosures of the above applications are incorporated herein by reference.

TECHNICAL FIELD

An embodiment relates to a base station and a terminal apparatus.

BACKGROUND ART

A wireless local area network (LAN) is known as a wireless system for wireless connecting a base station and a terminal apparatus.

CITATION LIST

Non Patent Literature

NPL 1: IEEE Std 802.11-2016, "FIG. 4-25 Establishing the IEEE 802.11 association" and "11.3 STA authentication and association", 7 Dec. 2016

SUMMARY OF THE INVENTION

Technical Problem

An object is to simplify a method of utilizing content distributed by wireless.

Means for Solving the Problem

A base station according to an embodiment includes a data processing unit and a wireless signal processing unit. The data processing unit generates a MAC frame. The MAC frame includes input data and an identification bit. The identification bit indicates that data is extended broadcast data. The wireless signal processing unit converts the MAC frame into a wireless signal to distribute the wireless signal.

Advantageous Effects of the Invention

A base station according to an embodiment can simplify a method of utilizing content distributed by wireless.

DESCRIPTION OF EMBODIMENTS

Figure 1:
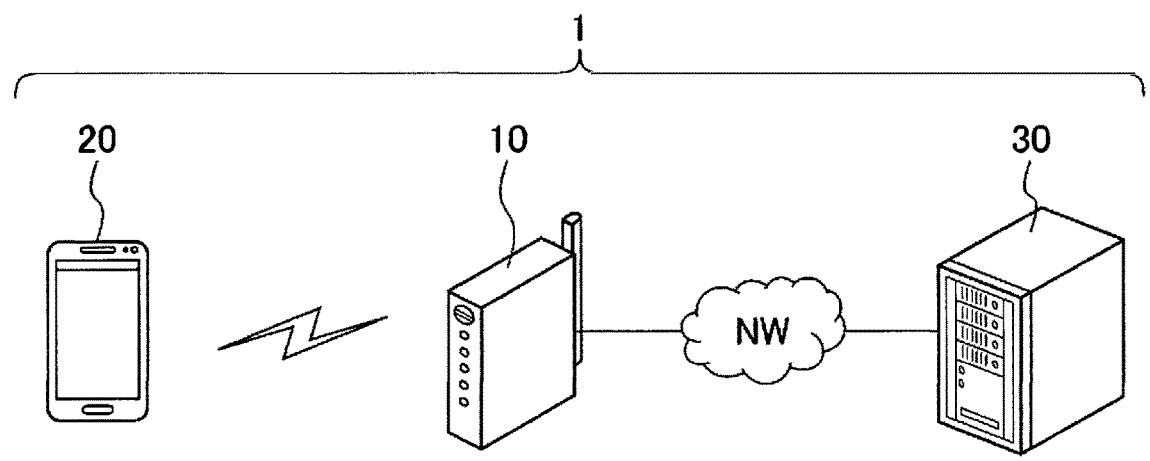
FIG. 1 is a conceptual diagram illustrating an example of an overall configuration of a wireless system according to a first embodiment.

Embodiments will be described below with reference to the drawings. Each embodiment describes, in an example, an apparatus or a method for embodying the technical idea of the invention. The drawings are schematic or conceptual, and the dimensions and ratios of each drawing are not necessarily identical to those in reality. The technical idea of the present invention is not specified by the shape, structure, arrangement, and the like of the constitution elements.

In the following description, constitution elements having substantially the same function and configuration are designated by the same reference numerals. A character following a number included in the reference numeral is referred to by reference numerals containing the same character and is used for distinguishing between elements having similar configurations. If it is not necessary to distinguish between elements represented by reference numerals containing the same number, these elements may be referred to by reference numerals containing only the same number.

<1> First Embodiment

A wireless system 1 according to a first embodiment will be described below.

<1-1> Configuration of Wireless System 1

FIG. 1 illustrates an example of an overall configuration of the wireless system 1 according to the first embodiment. As illustrated in FIG. 1, the wireless system 1 includes a base station 10, a terminal apparatus 20, and a server 30.

The base station 10 is connected to a network NW and is used as an access point for wireless LAN. The base station 10 can distribute, by wireless, data received from the network NW, to the terminal apparatus 20. The base station 10 may distribute data to the terminal apparatus 20 by using broadcast or may distribute data to the terminal apparatus 20 by using multicast. Communication between the base station 10 and the terminal apparatus 20 is based on the IEEE 802.11 standard, for example.

The terminal apparatus 20 is a wireless terminal apparatus such as a smartphone and a tablet PC. The terminal apparatus 20 may be connected to the base station 10 via wireless communication and may be connected to the network NW via the base station 10. Note that the terminal apparatus 20 may be another electronic device such as a desktop computer. It is suffices that the terminal apparatus 20 is communicatable with at least the base station 10 and has a configuration allowing for execution of an application described later.

The server 30 can hold various information, and holds, for example, content data for the terminal apparatus 20. The server 30 is connected to the network NW by wire and is configured to be communicatable with the base station 10 via the network NW. Note that the communication between the base station 10 and the server 30 may be wired communication or wireless communication. It is suffices that the server 30 is communicatable with at least the base station 10.

<1-1-1> Configuration of Base Station 10

Figure 2:
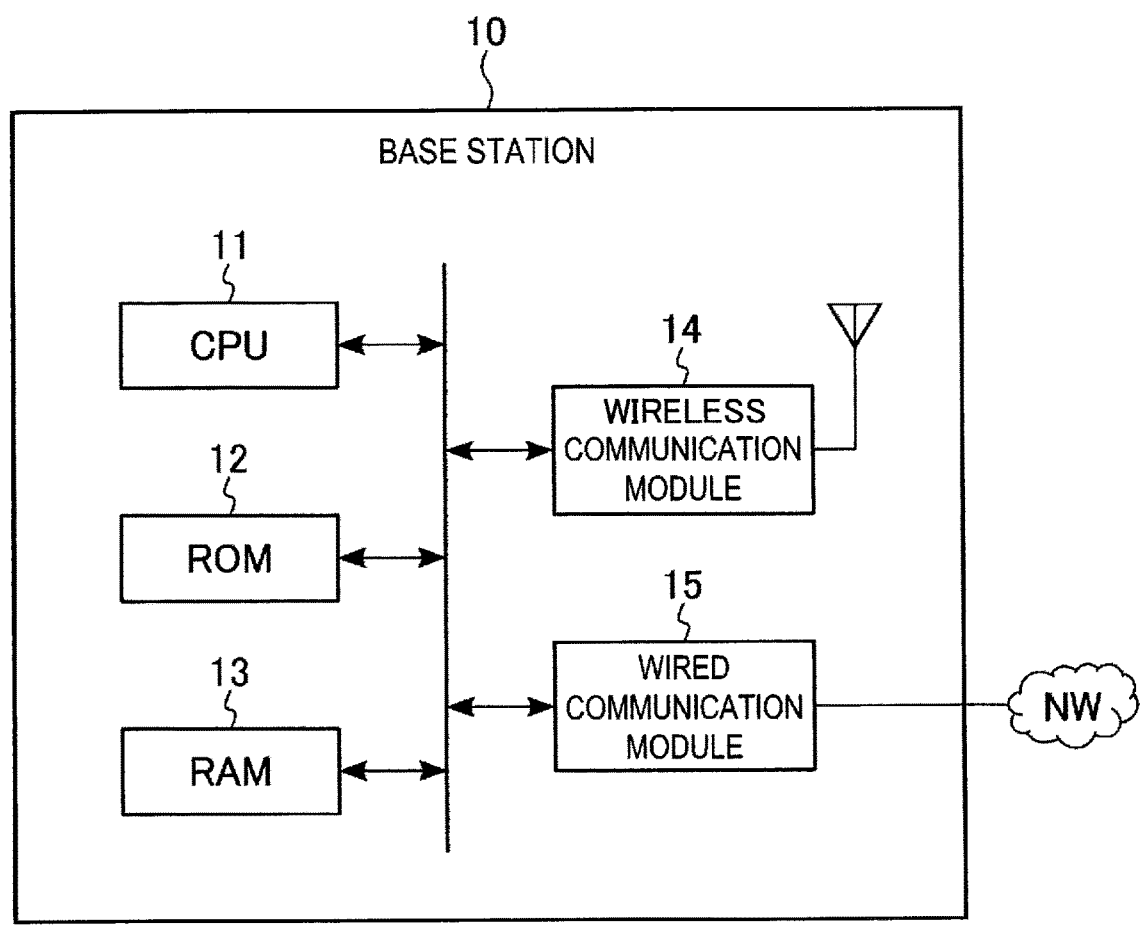
FIG. 2 is a block diagram illustrating an example of a configuration of a base station included in the wireless system according to the first embodiment.

FIG. 2 illustrates an example of a configuration of the base station 10 included in the wireless system 1 according to the first embodiment. As illustrated in FIG. 2, the base station 10 includes a central processing unit (CPU) 11, a read only memory (ROM) 12, a random access memory (RAM) 13, a wireless communication module 14, and a wired communication module 15.

The CPU 11 is a circuit capable of executing various programs, and controls an overall operation of the base station 10. The ROM 12 is a non-volatile semiconductor memory, and holds a program, control data, and the like for controlling the base station 10. The RAM 13 is, for example, a volatile semiconductor memory and is used as a work area of the CPU 11. The wireless communication module 14 is a circuit used for transmitting and receiving data by a wireless signal, and is connected to an antenna. The wired communication module 15 is a circuit used for transmitting and receiving data by a wired signal, and is connected to the network NW.

<1-1-2> Configuration of Terminal Apparatus 20

Figure 3:
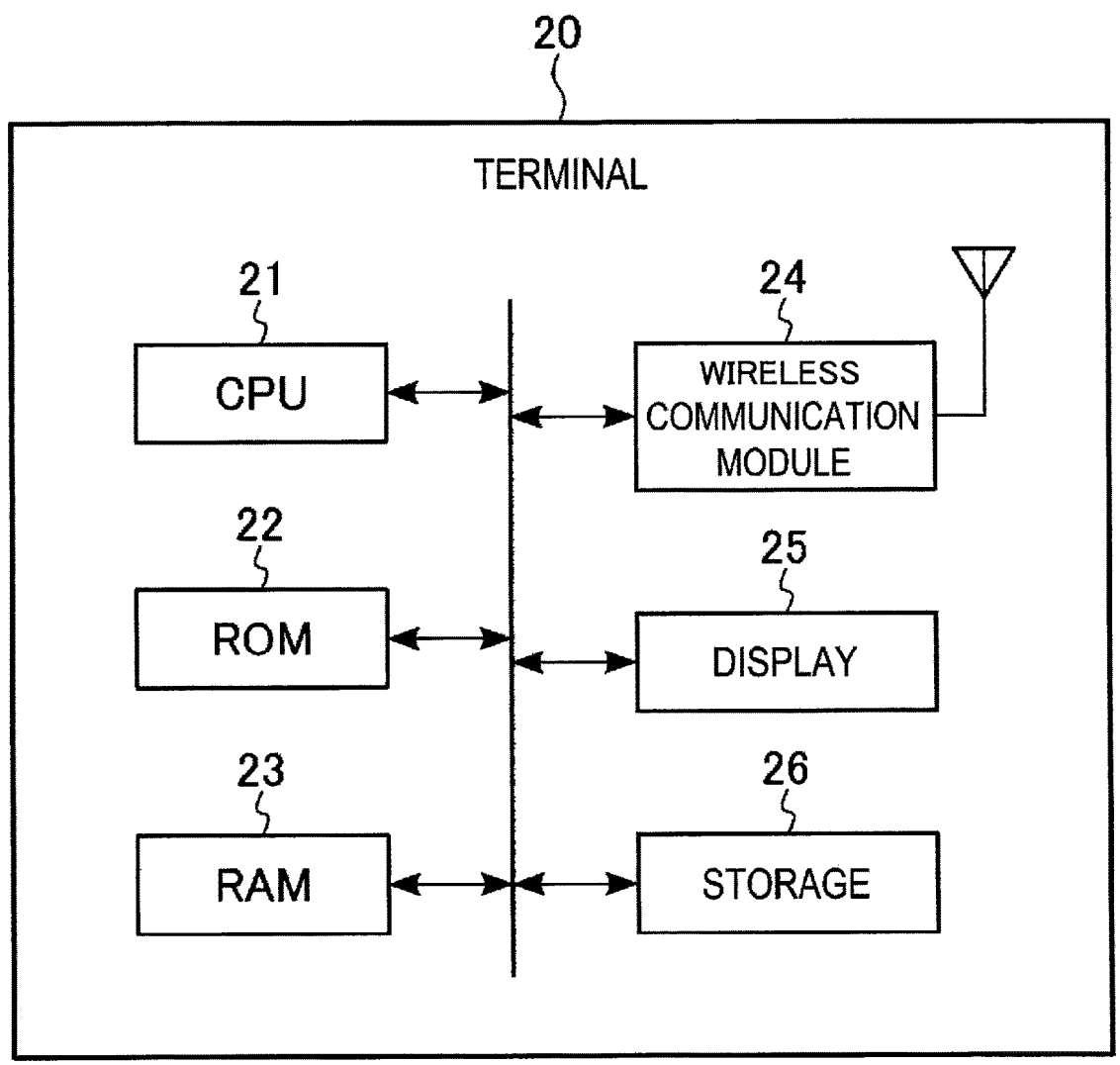
FIG. 3 is a block diagram illustrating an example of a configuration of a terminal apparatus included in the wireless system according to the first embodiment.

FIG. 3 illustrates an example of a configuration of the terminal apparatus 20 included in the wireless system 1 according to the first embodiment. As illustrated in FIG. 3, the terminal apparatus 20 includes a CPU 21, a ROM 22, a RAM 23, a wireless communication module 24, a display 25, and a storage 26.

The CPU 21 is a circuit capable of executing various programs, and controls an overall operation of the terminal apparatus 20. The ROM 22 is a non-volatile semiconductor memory, and holds a program, control data, and the like for controlling the terminal apparatus 20. The RAM 23 is, for example, a volatile semiconductor memory and is used as a work area of the CPU 21. The wireless communication module 24 is a circuit used for transmitting and receiving data by a wireless signal, and is connected to an antenna. The display 25 displays a graphical user interface (GUI) or the like corresponding to an application software, for example. The display 25 may function as an input interface of the terminal apparatus 20. The storage 26 is a non-volatile storage device, and holds, for example, system software of the terminal apparatus 20 and a content application described below.

<1-1-3> Configuration of Server 30

Figure 4:
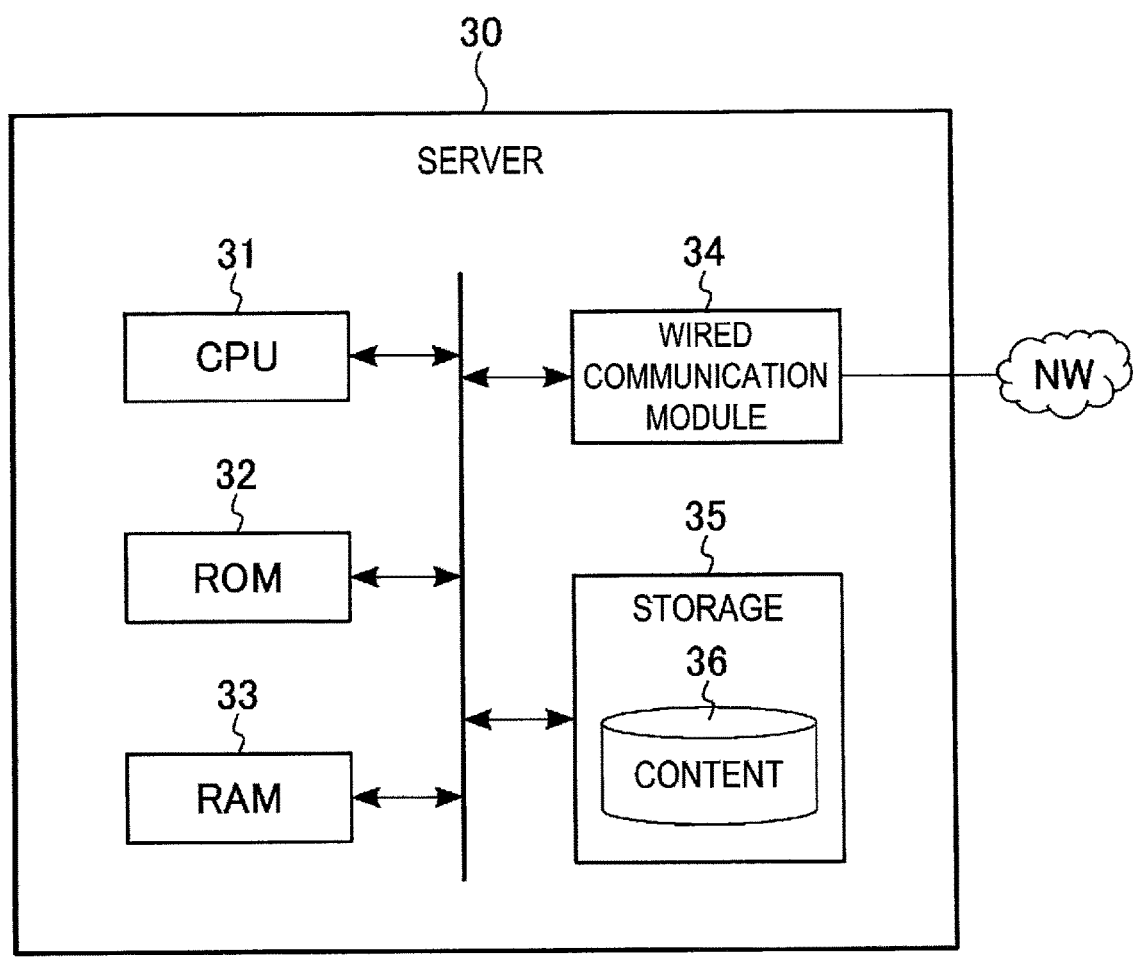
FIG. 4 is a block diagram illustrating an example of a configuration of a server included in the wireless system according to the first embodiment.

FIG. 4 illustrates an example of a configuration of the server 30 included in the wireless system 1 according to the first embodiment. As illustrated in FIG. 4, the server 30 includes a CPU 31, a ROM 32, a RAM 33, a wired communication module 34, and a storage 35.

The CPU 31 is a circuit capable of executing various programs, and controls an overall operation of the server 30. The ROM 32 is a non-volatile semiconductor memory, and holds a program, control data, and the like for controlling the server 30. The RAM 33 is, for example, a volatile semiconductor memory and is used as a work area of the CPU 31. The wired communication module 34 is a circuit used for transmitting and receiving data by a wired signal, and is connected to the network NW. The storage 35 is a non-volatile storage device, and holds, for example, system software of the server 30 and content 36. The content 36 is data used by a content application and may include video data and audio data, for example.

<1-2> Operation of Wireless System 1

The wireless system 1 according to the first embodiment executes data communication based on an open systems interconnection (OSI) reference model. In the OSI reference model, a communication function is divided into seven layers (first layer: physical layer, second layer: data link layer, third layer: network layer, fourth layer: transport layer, fifth layer: session layer, sixth layer: presentation layer, seventh layer: application layer). The data link layer includes a media access control (MAC) layer. Hereinafter, the third to seventh layers will be referred to as higher layers, with the MAC layer as reference.

<1-2-1> Processing in MAC Layer

Figure 5:
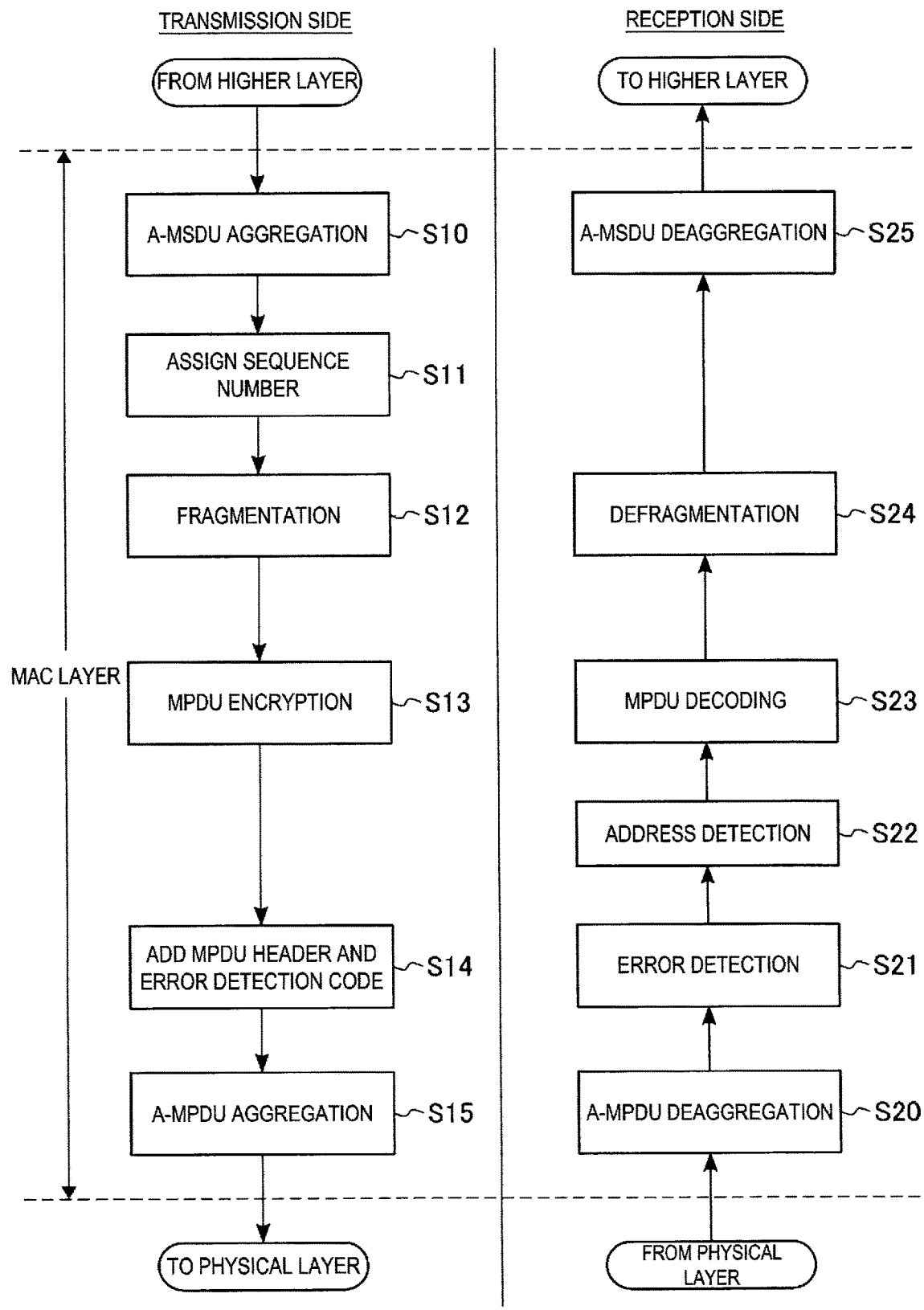
FIG. 5 is a flowchart illustrating an example of processing in a MAC layer of the base station and the terminal apparatus included in the wireless system according to the first embodiment.

Processing in the MAC layer is associated with passing signals between communication devices connected in a wired or wireless manner. FIG. 5 illustrates an example of the processing of the MAC layer in the base station 10 and the terminal apparatus 20 included in the wireless system 1 according to the first embodiment. An example of the processing of the MAC layer in each of a transmission side apparatus and a reception side apparatus will be sequentially described below with reference to FIG. 5.

(Processing of MAC Layer in Transmission Side Apparatus)

When processing in the higher layer for data to be transmitted is completed, the transmission side apparatus sequentially executes processing of steps S10 to S15 in the MAC layer.

In the processing of step S10, an A-MSDU aggregation is executed. The A-MSDU aggregation is processing of combining a plurality of pieces of data input from the higher layer to generate one aggregate-MAC service data unit (A-MSDU).

In the processing of step S11, a sequence number is assigned. For example, the sequence number is used for identifying the A-MSDU when the reception side apparatus transmits a block acknowledgment (ACK) as a reply to the transmission side apparatus.

In the processing of step S12, fragmentation is executed. The fragmentation is processing of fragmenting (dividing) the A-MSDU. Each of the fragmented A-MSDUs is referred to as an aggregate-MAC protocol data unit (MPDU). The MPDU corresponds to a data unit in the MAC layer.

In the processing of step S13, MPDU encryption is executed. The MPDU encryption is processing of encrypting the MPDU. For example, the encrypted MPDU is configured to be decodable between the base station 10 and the terminal apparatus 20 with established attribution to the base station 10.

In the processing of step S14, addition of an MPDU header and an error detection code is executed. The MPDU header is also referred to as a MAC header. The MAC header includes, for example, MAC addresses of a destination and a transmission source, an Ethertype field, and the like. The error detection code is used for error detection of data received by the reception side apparatus. A cyclic redundancy check (CRC) is employed for the error detection code, for example.

In the processing of step S15, an A-MPDU aggregation is executed. The A-MPDU aggregation is processing of combining a plurality of MPDUs to generate one aggregate-MAC protocol data unit (A-MPDU). The generated A-MPDU is output to the physical layer.

(Processing in Reception Side Apparatus)

Upon completion of processing in the physical layer for received data, the reception side apparatus sequentially executes processing of steps S20 to S25 in the MAC layer.

In the processing of step S20, an A-MPDU deaggrecation is executed. The A-MPDU deaggregation is processing of deaggregating (dividing) an A-MPDU input from the physical layer into MPDU units.

In the processing of step S21, an error detection is executed. The error detection is processing of detecting an error in the received data by using an error detection code. The reception side apparatus determines whether or not the data is successfully received, based on whether or not an error is detected. When the reception side apparatus successfully receives the data, the reception side apparatus transitions to the next processing using the data.

In the processing of step S22, address detection is executed. In the address detection, the reception side apparatus detects a MAC address of a destination included in the MAC header to determine whether or not the data is addressed to its own station. When the received data is addressed to its own station, the reception side apparatus transitions to the next processing using the data.

In the processing of step S23, MPDU decoding is executed. The MPDU decoding is processing of decoding an encrypted MPDU. Decoding of the MPDU is successful when the MPDU is data communicated between the base station 10 and the terminal apparatus 20 with established attribution to the base station 10. The reception side apparatus transitions to the next processing using the decoded MPDU.

In the processing of step S24, defragmentation is executed. The defragmentation is processing of combining a plurality of MPDUs to restore the A-MSDU.

In the processing of step S25, an A-MSDU deaggregation is executed. The A-MSDU deaggregation is processing of dividing the restored A-MSDU into MSDU units. The divided A-MSDUs are output to the higher layer.

<1-2-2> Extended Broadcast Data Distribution

The wireless system 1 according to the first embodiment can execute extended broadcast data distribution. The extended broadcast data distribution is one type of broadcast data distribution. Both the terminal apparatus 20 not having an established wireless connection with the base station 10 and a terminal apparatus having an established wireless connection with the base station 10 can receive the extended broadcast data distribution. In the extended broadcast data distribution, the processing of the MAC layer by the base station 10 and the terminal apparatus 20 is changed based on a type of content distributed from the server 30 to the terminal apparatus 20 via the base station 10. For example, in order to execute the extended broadcast data distribution, the base station 10 executes a content distribution program, and the terminal apparatus 20 executes a content application. An operation of each of the base station 10 and the terminal apparatus 20 in the wireless system 1 according to the first embodiment will be sequentially described below in detail.

(Operation of Base Station 10)

Figure 6:
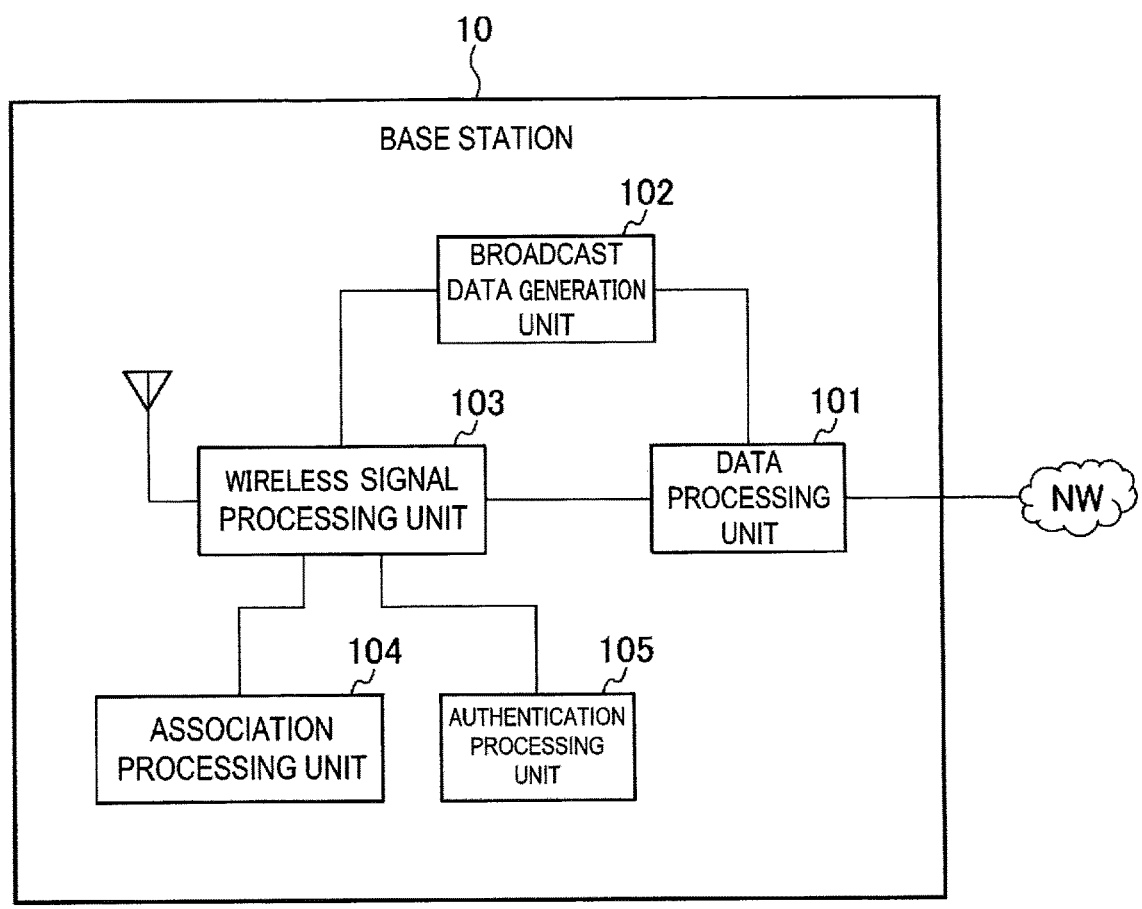
FIG. 6 is a block diagram illustrating an example of a function of the base station included in the wireless system according to the first embodiment.

FIG. 6 illustrates an example of a function of the base station 10 when the content distribution program is executed by the CPU 11. As illustrated in FIG. 6, the base station 10 may function as a data processing unit 101, a broadcast data generation unit 102, a wireless signal processing unit 103, an association processing unit 104, and an authentication processing unit 105, for example.

The data processing unit 101 transmits and receives data between the base station 10 and the server 30 via the network NW. Furthermore, in accordance with a type of data received from the server 30, the data processing unit 101 outputs the data to the broadcast data generation unit 102 or the wireless signal processing unit 103. The data processing unit 101 may execute the process illustrated in FIG. 5 to generate a MAC frame.

The broadcast data generation unit 102 uses the content 36 transferred from the server 30 to generate a MAC frame corresponding to extended broadcast data distribution. The broadcast data generation unit 102 outputs the generated MAC frame to the wireless signal processing unit 103. Hereinafter, the MAC frame being generated by the broadcast data generation unit 102 and including the content 36 is also referred to as a program. The program is configured to be received by the terminal apparatus 20 activating the content application.

The wireless signal processing unit 103 transmits and receives data between the base station 10 and the terminal apparatus 20 via wireless communication. Specifically, the wireless signal processing unit 103 outputs a MAC frame received via an antenna to the data processing unit 101. Furthermore, the wireless signal processing unit 103 converts the MAC frame received from the data processing unit 101 or the broadcast data generation unit 102 into a wireless signal to distribute the wireless signal via the antenna of the base station 10.

When the wireless signal processing unit 103 receives a connection request for communication with the network NW from the terminal apparatus 20, the association processing unit 104 executes a protocol for association. When the wireless signal processing unit 103 receives a connection request for communication with the network NW from the terminal apparatus 20, the authentication processing unit 105 executes a protocol for authentication.

Figure 7:
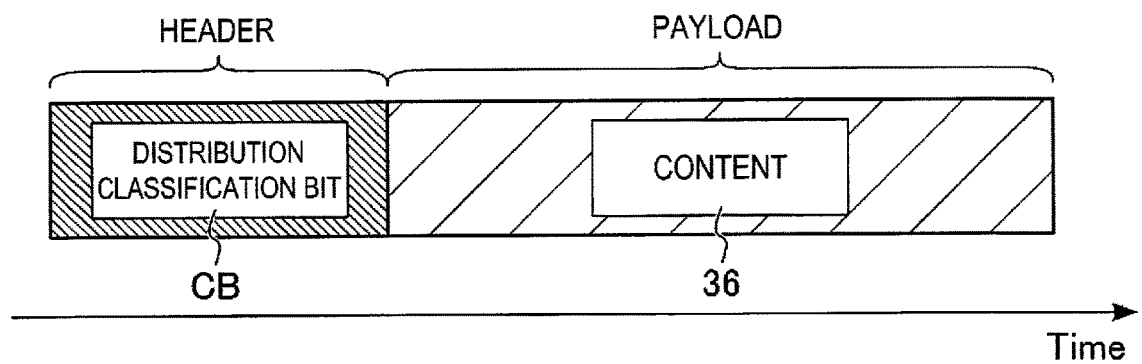
FIG. 7 is a conceptual diagram illustrating an example of a MAC frame distributed by the base station included in the wireless system according to the first embodiment.

FIG. 7 illustrates an example of a MAC frame distributed by the base station 10 included in the wireless system 1 according to the first embodiment. As illustrated in FIG. 7, the MAC frame includes a header (MAC header) and a payload (MAC payload). The header includes, for example, an address of a transmission side terminal apparatus, an address of a reception side terminal apparatus, and a distribution classification bit CB. The payload includes the content 36, for example. Note that, as illustrated in FIG. 13 described later, the payload (a frame body in FIG. 13) may include information for identifying content. That is, the distribution classification bit CB being information for identifying content may be included in any part of the MAC frame. Hereinafter, description will proceed on the assumption that the distribution classification bit CB is included in the MAC header.

The distribution classification bit CB included in the header corresponds to information indicating that the MAC frame uses extended broadcast data distribution. For example, when the distribution classification bit CB is "0", the MAC frame is associated with the extended broadcast data distribution. However, this is not limiting, and when the distribution classification bit CB is "1", the MAC frame may also be associated with the extended broadcast data distribution. It is suffices that the distribution classification bit CB allows for identifying the extended broadcast data distribution. The association between the distribution classification bit CB and a distribution classification may be any set. The distribution classification bit CB may include a plurality of bits. The distribution classification bit CB may be referred to as an identification bit or identification information.

Figure 8:
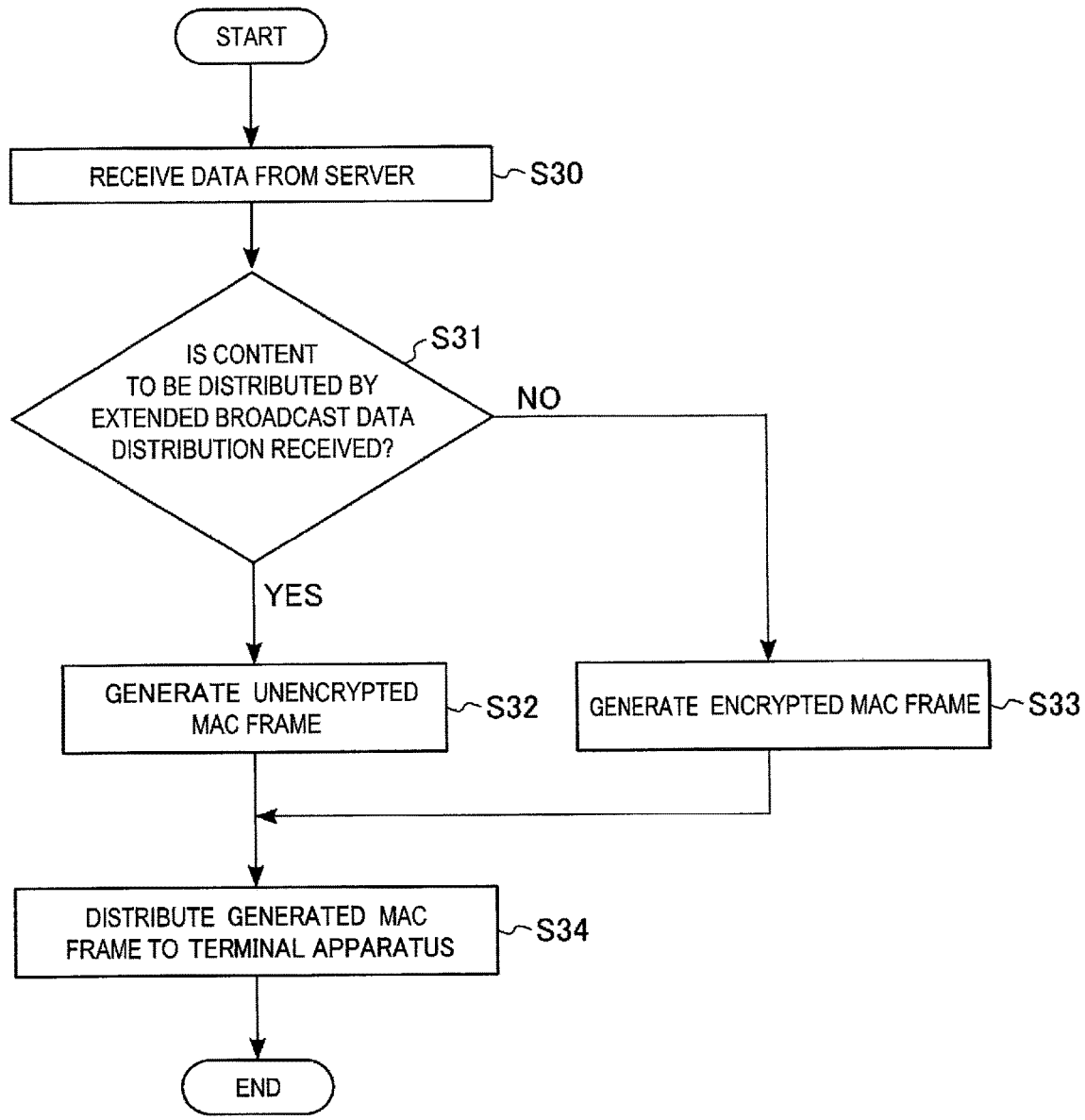
FIG. 8 is a flowchart illustrating an example of an operation of the base station included in the wireless system according to the first embodiment.

FIG. 8 is a flowchart illustrating an example of an operation of the base station 10 included in the wireless system 1 according to the first embodiment. An example of an operation sequence of the base station 10 included in the wireless system 1 according to the first embodiment will be described below with reference to FIG. 8.

First, the base station 10 receives data from the server 30 (step S30). The data includes information indicating whether or not the data is to be distributed by extended broadcast data distribution, and the content 36. Next, the data processing unit 101 executes processing of the physical layer for the received data, and then, executes processing of the MAC layer. The processing of the MAC layer includes a step of checking whether or not the received data is content to be distributed by extended broadcast data distribution (step S31).

When content to be distributed by extended broadcast data distribution is received (step S31, YES), the broadcast data generation unit 102 generates an unencrypted MAC frame (step S32). Specifically, the data processing unit 101 first outputs the received data to the broadcast data generation unit 102. Subsequently, the broadcast data generation unit 102 generates a MAC frame including a header added with the distribution classification bit CB indicating the extended broadcast data distribution and a payload storing the received data (the content 36). In this case, in the processing of the MAC layer, the processing (MPDU encryption) of step S13 illustrated in FIG. 5, for example, is omitted. Next, the broadcast data generation unit 102 outputs the generated MAC frame to the wireless signal processing unit 103. The unencrypted MAC frame may be distributed not only to the terminal apparatus 20 belonging to the base station 10 but also to the terminal apparatus 20 not belonging to the base station 10. That is, the unencrypted MAC frame may be received by the terminal apparatus 20 without performing association processing and authentication processing between the base station 10 and the terminal apparatus 20.

On the other hand, when content not to be distributed by extended broadcast data distribution is received (step S31, NO), the data processing unit 101 generates an encrypted MAC frame (step S33). Specifically, the data processing unit 101 firstly executes the processing of steps S10 to S15 illustrated in FIG. 5 to generate a MAC frame. In this case, in the processing of the MAC layer, MPDU encryption is executed, and thus, the received data is encrypted. Next, the data processing unit 101 outputs the generated MAC frame to the wireless signal processing unit 103. The encrypted MAC frame is distributed to the terminal apparatus 20 belonging to the base station 10. That is, association processing and authentication processing between the base station 10 and the terminal apparatus 20 is executed, and then, the encrypted MAC frame is distributed to the terminal apparatus 20.

After the processing of step S32 or S33 is executed, the wireless signal processing unit 103 distributes the MAC frame input by the data processing unit 101 or the broadcast data generation unit 102 to the terminal apparatus 20 via the antenna (step S34). Note that the base station 10 may repeatedly execute the processing of step S34 for a certain generated MAC frame, in accordance with a setting of the content distribution program. The MAC frame distributed by the base station 10 may be a MAC frame for broadcast or a MAC frame for multicast.

Operation of Terminal Apparatus 20

Figure 9:
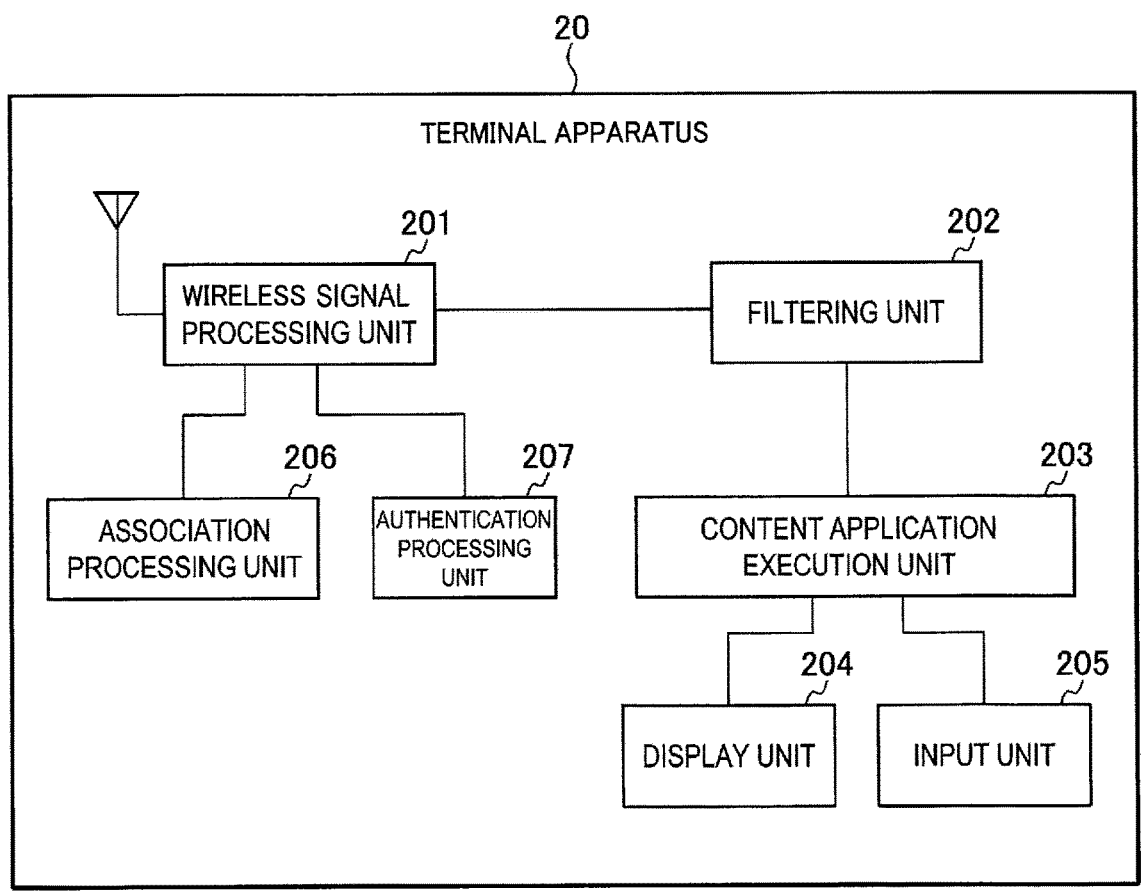
FIG. 9 is a block diagram illustrating an example of a function of the terminal apparatus included in the wireless system according to the first embodiment.

FIG. 9 illustrates an example of a function of the terminal apparatus 20 when the content application is executed by the CPU 21. As illustrated in FIG. 9, the terminal 20 may function as a wireless signal processing unit 201, a filtering unit 202, a content application execution unit 203, a display unit 204, an input unit 205, an association processing unit 206, and an authentication processing unit 207, for example.

The wireless signal processing unit 201 transmits and receives data between the base station 10 and the terminal apparatus 20 via wireless communication. Specifically, the wireless signal processing unit 201 outputs a MAC frame received via an antenna to the filtering unit 202. Furthermore, the wireless signal processing unit 201 transmits a MAC frame received from the filtering unit 202 via the antenna of the terminal apparatus 20.

The filtering unit 202 controls input and output of data between the wireless signal processing unit 201 and the higher layer in the terminal apparatus 20. For example, when data for the content application is input from the wireless signal processing unit 201, the filtering unit 202 outputs the data to the content application execution unit 203. Furthermore, the filtering unit 202 may also generate a MAC frame to output the MAC frame to the wireless signal processing unit 201.

The content application execution unit 203 executes a content application capable of utilizing the data input from the filtering unit 202. The display unit 204 corresponds to a part of a display area of the display 25. The input unit 205 is realized by the display 25 functioning as a touch panel, for example. The content application may be operated based on a signal from the input unit 205.

When the wireless signal processing unit 201 makes a connection request to the base station 10 for communication with the network NW, the association processing unit 206 executes a protocol for association. When the wireless signal processing unit 201 makes a connection request to the base station 10 for communication with the network NW, the authentication processing unit 207 executes a protocol for authentication.

Figure 10:
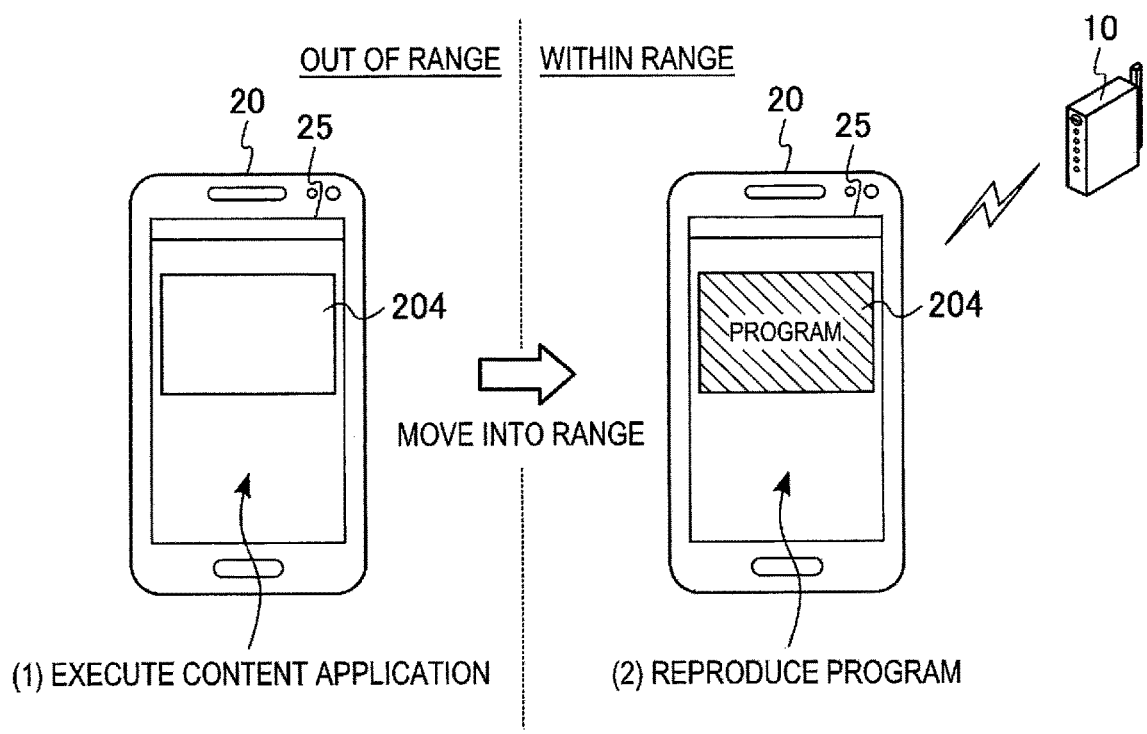
FIG. 10 is a conceptual diagram illustrating a specific example of an operation of the terminal apparatus included in the wireless system according to the first embodiment.

FIG. 10 illustrates an example of an operation when the terminal apparatus 20 executing the content application moves from outside a range of the base station 10 executing the content distribution program to within the range of the base station 10 and the example is a specific example of an operation of the terminal apparatus 20 included in the wireless system 1 according to the first embodiment. FIG. 10(1) corresponds to a state of the terminal apparatus 20 outside the range of the base station 10. FIG. 10(2) corresponds to a state of the terminal apparatus 20 within the range of the base station 10.

When the content application is executed, the content application execution unit 203 displays a GUI of the content application on the display 25. As illustrated in FIG. 10(1), when the terminal apparatus 20 is located outside the range of the base station 10, the content application execution unit 203 does not display information on the display unit 204. This is not limiting, and the content application execution unit 203 may display, on the display unit 204, a message or the like indicating that content cannot be received.

When the terminal apparatus 20 moves into the range of the base station 10, a state of the content application changes. When the terminal apparatus 20 moves into the range of the base station 10 as illustrated in FIG. 10(2), the terminal apparatus 20 can receive a wireless signal distributed by the base station 10. At this time, the base station 10 distributes content (a program) to be distributed by extended broadcast data distribution, and the terminal apparatus 20 does not belong to the base station 10. The content application uses the display unit 204 to reproduce the program distributed by the base station 10, without a user operation. In other words, the content application execution unit 203 displays, on the display unit 204, the program distributed from the base station 10 by extended broadcast data distribution.

Figure 11:
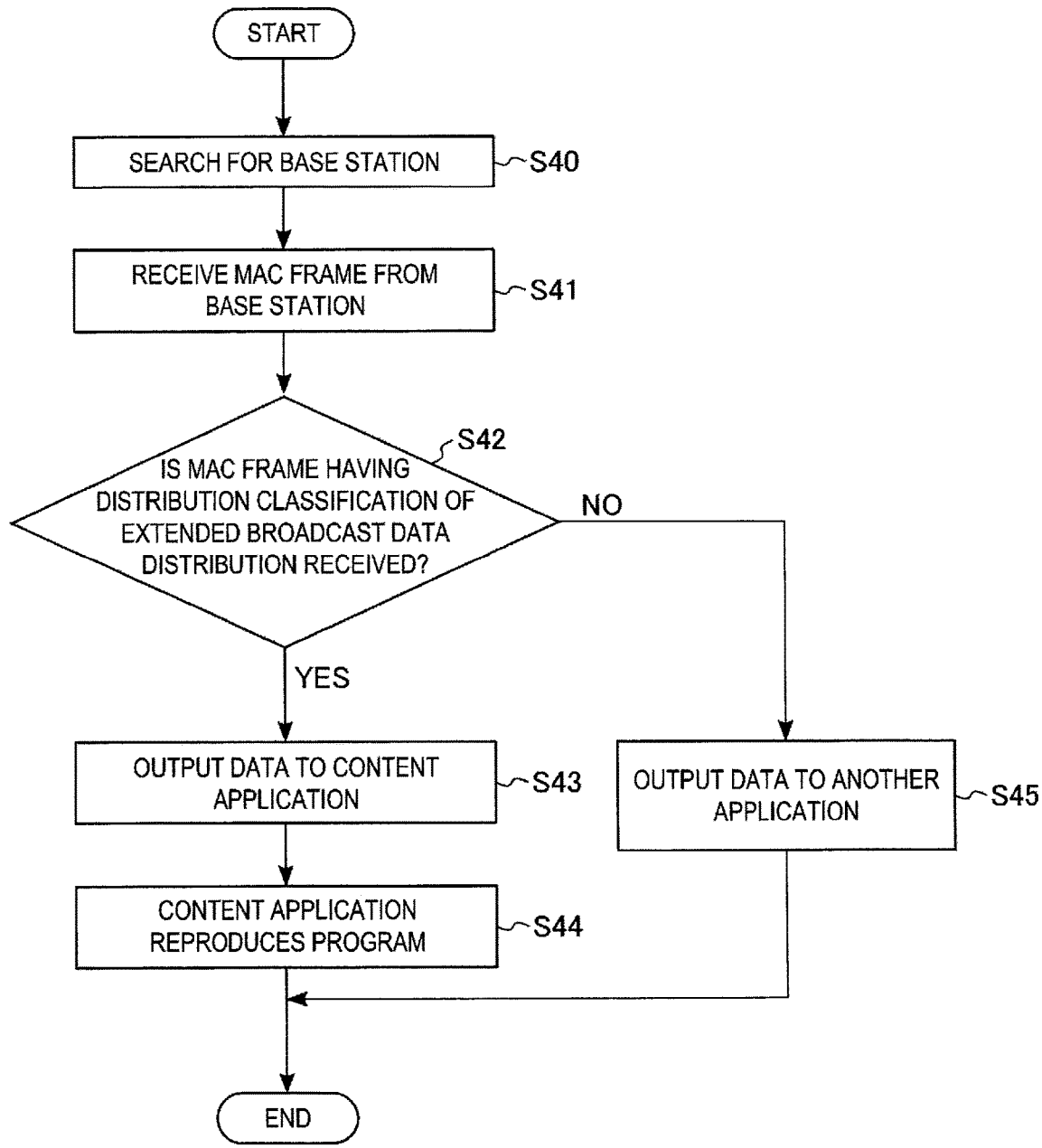
FIG. 11 is a flowchart illustrating an example of the operation of the terminal apparatus included in the wireless system according to the first embodiment.

FIG. 11 is a flowchart illustrating an example of an operation of the terminal apparatus 20 included in the wireless system 1 according to the first embodiment. A specific example of an operation sequence of the terminal apparatus 20 included in the wireless system 1 according to the first embodiment will be described below with reference to FIG. 11.

First, the wireless signal processing unit 201 searches for the base station 10 (step S40). At this time, when the terminal apparatus 20 is not within the range of the base station 10, the terminal apparatus 20 repeatedly searches for the base station 10. On the other hand, when the terminal apparatus 20 is within the range of the base station 10, the wireless signal processing unit 201 receives the MAC frame from the base station 10 (step S41). Subsequently, the wireless signal processing unit 201 outputs the received MAC frame to the filtering unit 202.

Upon receiving the MAC frame, the filtering unit 202 executes the processing of the MAC layer. The processing of the MAC layer includes a step (step S42) of checking whether or not the distribution classification of the received MAC frame is the extended broadcast data distribution. Specifically, in the processing (address detection) of step S22 illustrated in FIG. 5, for example, the filtering unit 202 checks the distribution classification bit CB in the header included in the MAC frame.

When the distribution classification of the received MAC frame is the extended broadcast data distribution (step S42, YES), the filtering unit 202 outputs processed data to the content application (step S43), and the content application uses the data to reproduce a program (step S44). In other words, the filtering unit 202 extracts data of the extended broadcast data distribution to output the extracted data to the content application execution unit 203. Next, the content application execution unit 203 uses the input data to display the program on the display unit 204. Note that the processing of steps S43 and S44 may be executed without executing the association processing and the authentication processing between the base station 10 and the terminal apparatus 20.

When the distribution classification of the received MAC frame is not the extended broadcast data distribution (step S42, NO), the filtering unit 202 outputs the processed data to an application other than the content application (step S45). Note that the processing of step S45 is executed when the terminal apparatus 20 belongs to the base station 10. That is, when another application utilizes the content distributed by the base station 10, the association processing and the authentication processing between the base station 10 and the terminal apparatus 20 are executed before the processing of step S45. When the terminal apparatus 20 does not belong to the base station 10, the filtering unit 202 fails to decode the encrypted MAC frame before the processing of step S45.

<1-3> Advantageous Effects of First Embodiment

According to the wireless system 1 of the first embodiment described above, it is possible to simplify a method of utilizing content distributed by wireless. A detailed effect of the wireless system 1 according to the first embodiment will be described below.

When data is communicated between a wireless terminal apparatus and a base station, the wireless terminal apparatus first searches for the base station. When the base station is detected, processing such as association and authentication is executed between the wireless terminal apparatus and the base station. This processing includes, in a case of an initial connection processing, user operations such as selection of a service set identifier (SSID), acquisition of a password, and input of a password. If the processing such as the association and the authentication is successful, the wireless terminal apparatus belongs to the base station. The wireless terminal apparatus belonging to the base station can access, via the base station, data stored in a server connected to the network.

A wireless terminal apparatus such as a smartphone sometimes utilizes content distributed by the server, depending on an application executed by the wireless terminal apparatus. An example of the content distributed by wireless includes an interpretation service for a lecture. When such a service is provided, a base station (an access point) is installed in a place likely to be visited for the first time by a user, such as a lecture hall or a conference hall. That is, a wireless terminal apparatus held by the user and the base station distributing the content may require initial connection processing as described above.

Thus, the user may need to perform complicated processing every time the user utilizes similar services at various locations. On the other hand, a service operator also needs to provide passwords to a large number of users and explain an operation method for connecting the wireless terminal apparatus and the base station. Additionally, in such a service, a large number of wireless terminal apparatuses may belong to the base station. When the number of wireless terminal apparatuses belonging to the base station increases, lines of the base station may be congested. That is, the communication speed between the wireless terminal apparatuses and the base station may decrease, and thus, the service quality may decrease.

The wireless system 1 according to the first embodiment utilizes extended broadcast data distribution in which the association processing and the authentication processing between the base station 10 and the terminal apparatus 20 are omitted. Briefly, the base station 10 generates a MAC frame including a header containing information indicating that extended broadcast data distribution is utilized and a payload containing content received from the server 30. This MAC frame is unencrypted, and the MAC frame is distributed by broadcast or multicast, for example. On the other hand, the terminal apparatus 20 executes an application utilizing the content. Next, when the terminal apparatus 20 receives a wireless signal of the base station 10, the content application reproduces the content (a program), regardless of whether the terminal apparatus 20 belongs to the base station 10.

Thus, the user can utilize the content in a state where the association processing and the authentication processing between the base station 10 and the terminal apparatus 20 are omitted. In the wireless system 1 according to the first embodiment, an operation of a service operator only sets distribution of content to the base station 10, for example. Furthermore, the user only needs to execute the content application in the terminal apparatus 20 to utilize the service, for example. Thus, the wireless system 1 according to the first embodiment simplifies a method of utilizing content distributed by wireless and improves convenience for both the user and the service operator. Furthermore, the wireless system 1 according to the first embodiment can suppress congestion in lines of the base station 10 to improve the quality of the service provided by the operator.

<2> Second Embodiment

The wireless system 1 according to a second embodiment has a configuration similar to that of the first embodiment and utilizes extended broadcast data distribution to achieve selective utilization of a plurality of pieces of content. The wireless system 1 according to the second embodiment will be described with a focus on a difference from the first embodiment.

<2-1> Operation of Wireless System 1

In the wireless system 1 according to the second embodiment, the server 30 holds, for example, first content corresponding to Japanese interpretation and second content corresponding to English interpretation. The base station 10 uses a plurality of pieces of content received from the server 30 to generate a program table. The base station 10 distributes each of the generated program table and a plurality of pieces of content associated with the program table to a terminal apparatus in an extended broadcast data distribution setting. Note that the "extended broadcast data distribution setting" indicates that the distribution classification bit CB included in the header is a bit corresponding to the extended broadcast data distribution.

Figure 12:
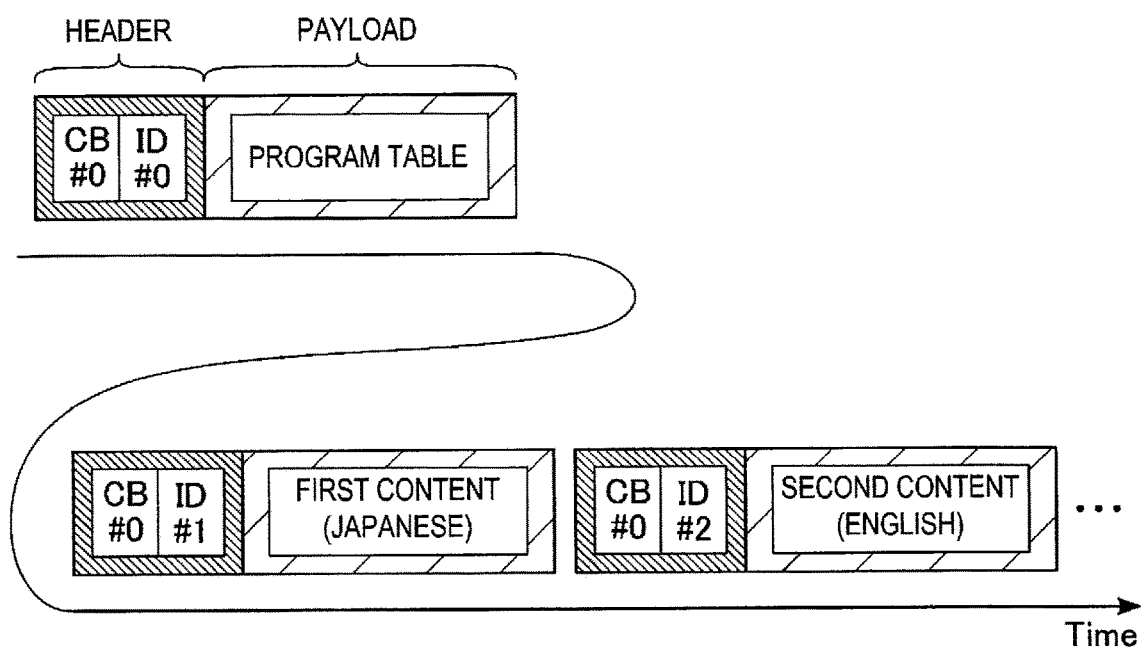
FIG. 12 is a conceptual diagram illustrating an example of a MAC frame distributed by a base station included in a wireless system according to a second embodiment.

FIG. 12 illustrates an example of a MAC frame distributed by the base station 10 included in the wireless system 1 according to the second embodiment. As illustrated in FIG. 12, in the second embodiment, the base station 10 generates a program table and a plurality of MAC frames respectively corresponding to the first content and the second content, for example.

In the second embodiment, the header includes a distribution classification bit CB and an identifier (ID). Numbers (for example, positive integers) different from each other as ID is assigned to each of the program table and the plurality of pieces of content. A payload corresponding to the program table includes title information of the plurality of pieces of content to be distributed by extended broadcast data distribution, and ID information in which the title information and the ID are associated. The payload corresponding to content includes content associated with the ID contained in the header. Note that these pieces of control information may be included in the MAC header being a header of the MAC frame, or may be included in a header of a higher layer or a lower layer. In the following description, it is assumed that the control information is included in the MAC frame.

For example, ID="0" indicates that the payload of the MAC frame includes a program table. ID="1" indicates that the payload of the MAC frame includes the first content (Japanese). ID="2" indicates that the payload of the MAC frame includes the second content (English). Note that the ID assigned to each of the program table and the plurality of pieces of content may be set to any number. In the second embodiment, it is suffices that the ID of the program table is at least fixed. Furthermore, the ID (an ID field) may be included in the payload instead of the header.

Figure 13A:
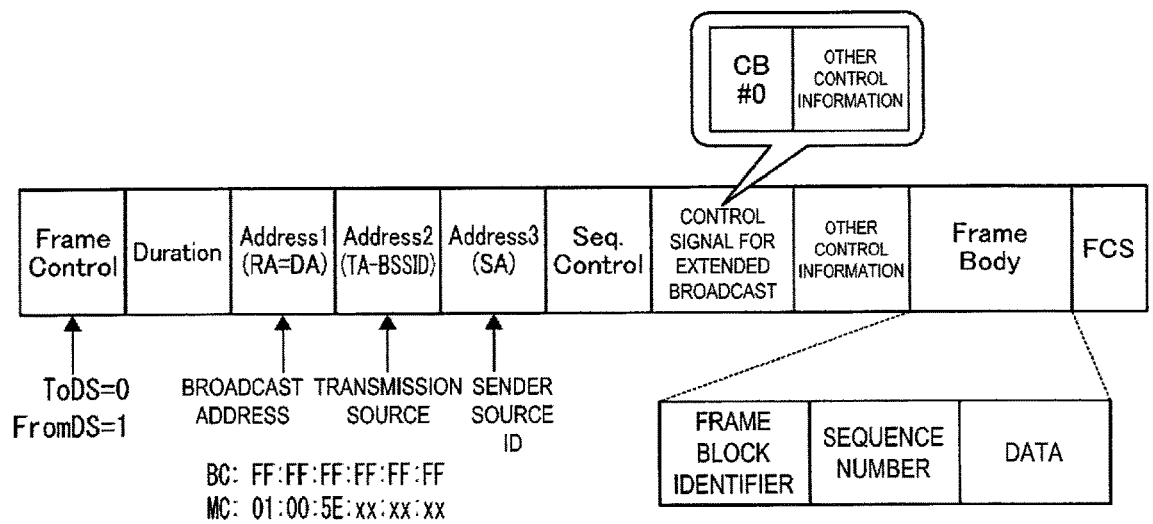
FIG. 13A is a conceptual diagram illustrating a specific example of a format of a wireless frame in the wireless system according to the second embodiment.
Figure 13B:
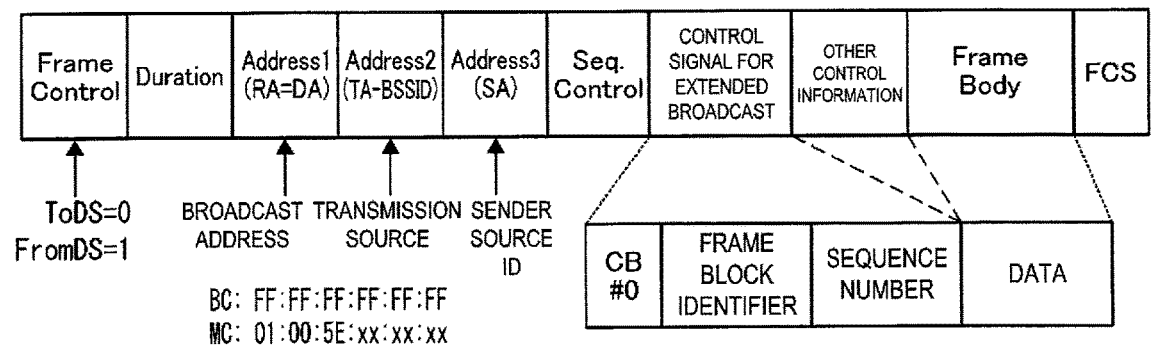
FIG. 13B is a conceptual diagram illustrating a specific example of a format of the wireless frame in the wireless system according to the second embodiment.

FIGS. 13A and 13B illustrate specific examples of a format of a wireless frame in the wireless system 1 according to the second embodiment, and correspond to an example in which the ID is included in the payload. As illustrated in FIG. 13A, the wireless frame includes, for example, a frame control field, a duration field, an address 1 field, an address 2 field, an address 3 field, a sequence control field, an extended broadcast data distribution control information field, a field including other control information, a frame body field, and a frame check sequence (FCS) field. For example, the fields from the frame control field to the field including other control information correspond to the header. The fields from the frame body field to the FCS field correspond to the payload.

The frame control field indicates various pieces of control information. For example, a meaning of the control information differs depending on a combination of To Distribution System (To DS) and From Distribution System (From DS). For example, "00 (To DS/From DS)" indicates that data is data between terminal apparatuses in the same IBSS. "10" indicates that a data frame is directed to the distribution system (DS) from the outside. "01" indicates that the data frame is directed to the outside of the DS. "11" is used when a mesh network is formed. The duration field indicates a scheduled period during which a wireless line is used. The address 1 field indicates a broadcast address (RA=DA). The address 2 field indicates a transmission source ID (TA-BSSID). The address 3 field indicates a sender source ID (SA). The sequence control field indicates a sequence number of the MAC frame and a fragment number for fragmentation. The extended broadcast data distribution control information field includes the distribution classification bit CB. The frame body field stores a frame block identifier, a sequence number, and data, for example. In the frame body field, the frame block identifier may be referred to as a flow identifier FID. The sequence number is assigned to each {SA, FID} pair. The data corresponds to data transmitted by broadcast. The FCS stores the header and an error detection code of the frame body, and is used to determine whether an error occurs.

For example, the above ID assigned to the program table, the content, and the like corresponds to the flow identifier FID. The distribution classification bit CB may be inserted at any location in the header. In this case, the terminal apparatus 20 checks the sender source ID (SA), the flow identifier FID, and the sequence number to identify whether the data is the same broadcast data. Furthermore, the terminal apparatus 20 uses the distribution classification bit CB to identify extended broadcast data distribution. The content application acquires the ID from the payload, sorts the data in the order of the sequence number, and reproduces the data. Furthermore, as illustrated in FIG. 13B, the frame block identifier (FID) and the sequence number may be included in the header. Thus, for example, the extended broadcast data distribution control information field may be newly added to the header. In this case, each piece of control information has a similar role as in the case where these pieces of control information are included in the payload.

Figure 14:
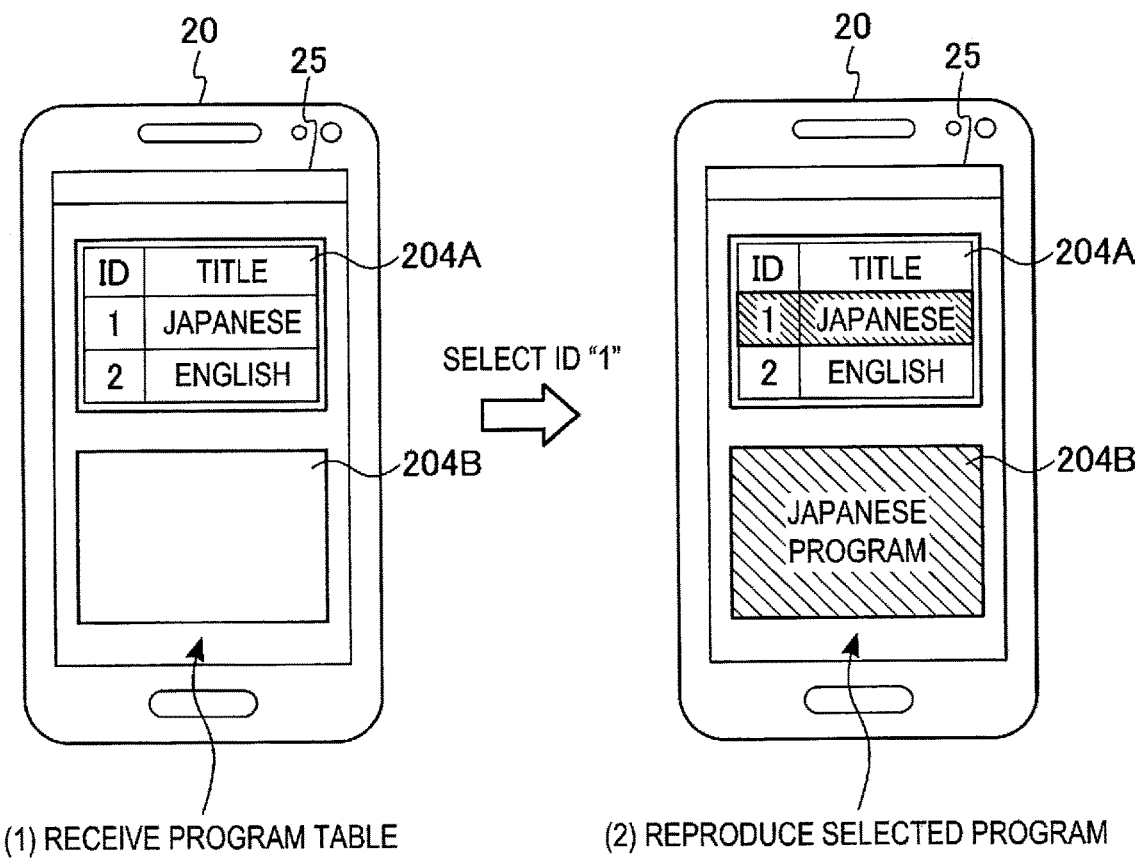
FIG. 14 is a conceptual diagram illustrating a specific example of an operation of a terminal apparatus included in the wireless system according to the second embodiment.

FIG. 14 illustrates an example of an operation when a plurality of pieces of content are selectively executed by the terminal apparatus 20 executing the content application and the example is a specific example of an operation of the terminal apparatus 20 included in the wireless system 1 according to the second embodiment. Each of FIGS. 14(1) and 14(2) corresponds to a state of the terminal apparatus 20 executing the content application.

When the content application is executed, the content application execution unit 203 displays a GUI of the content application on the display 25. The content application in the second embodiment uses display units 204A and 204B within the display 25, for example. As illustrated in FIG. 14(1), when the terminal apparatus 20 receives a program table, the program table is displayed on the display unit 204A, but no information is displayed on the display unit 204B, for example.

For example, when ID "1" is selected through a user operation, a Japanese program associated with the selected ID is reproduced on the display unit 204B, as illustrated in FIG. 10(2). On the other hand, although not illustrated, when ID "2" is selected through a user operation, an English program associated with the selected ID is reproduced on the display unit 204B.

Figure 15:
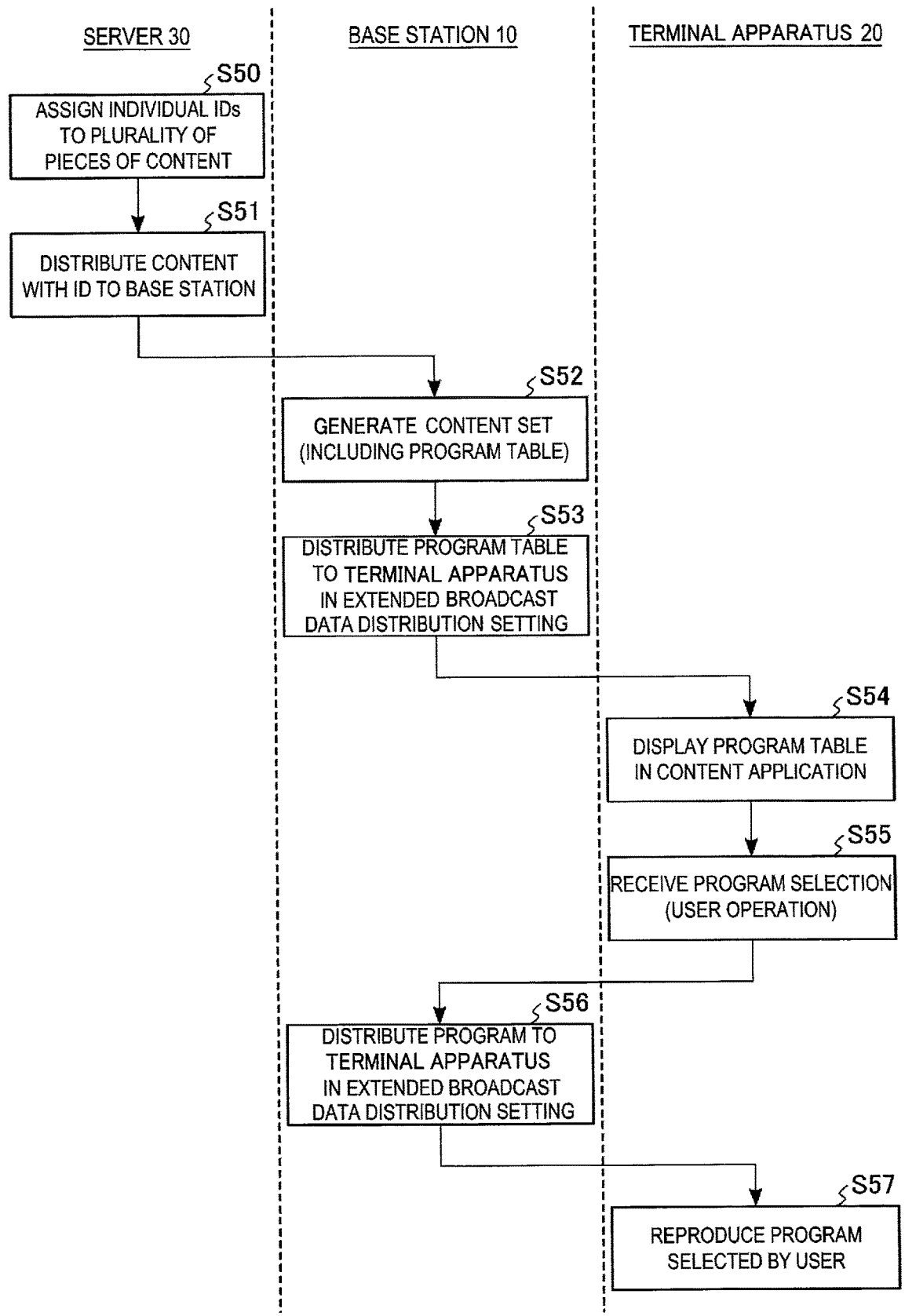
FIG. 15 is a flowchart illustrating an example of an operation of the wireless system according to the second embodiment.

FIG. 15 is a flowchart illustrating an example of an operation of the wireless system 1 according to the second embodiment. A specific example of an operation sequence of the wireless system 1 according to the second embodiment will be described below with reference to FIG. 15.

First, the server 30 assigns, to each of the plurality of pieces of content, an ID by which the base station 10 can determine content (step S50). The server 30 distributes each of the plurality of pieces of content assigned with IDs different from each other, to the base station 10 (step S51). These pieces of content with the IDs are prepared for the content application and also include title information of the content.

Next, the base station 10 uses the pieces of content with the IDs received from the server 30 to generate a content set including a program table and a program (step S52). Specifically, the broadcast data generation unit 102 generates a program table, based on the received plurality of pieces of content with the IDs. The broadcast data generation unit 102 generates a MAC frame including the program table and a MAC frame for each piece of content. At this time, the broadcast data generation unit 102 inserts the ID of the received content into the header and inserts the content into the payload. Subsequently, the base station 10 distributes the generated program table to the terminal apparatus 20 in an extended broadcast data distribution setting (step S53). That is, the wireless signal processing unit 103 distributes, via the antenna, a MAC frame corresponding to the program table among the content set generated in step S52. The distributed program table is unencrypted, and thus, may be received by any one of the terminal apparatuses 20.

Next, the terminal apparatus 20 receives the program table distributed from the base station 10, for example, without belonging to the base station 10. As a result, when input data is the ID assigned to the program table, the filtering unit 202 outputs the data to the content application execution unit 203. Next, the content application execution unit 203 displays the program table in the content application (step S54). After that, the content application comes into a state of receiving selection of a program (step S55). In this state, when a program is selected through a user operation, the terminal apparatus 20 comes into a state where the terminal apparatus 20 can reproduce the selected program.

Next, the base station 10 distributes a plurality of programs to the terminal apparatus 20 in an extended broadcast data distribution setting (step S56). The plurality of programs are unencrypted, and thus, the terminal apparatus 20 can receive the plurality of programs distributed from the base station 10, without belonging to the base station 10.

Next, the terminal apparatus 20 selectively reproduces a program selected by the user from among the plurality of received programs (step S57). Specifically, the filtering unit 202 selectively outputs data of a program corresponding to an ID selected by the user to the content application execution unit 203. Next, the content application execution unit 203 uses the display unit 204 to reproduce the input program. When the ID of the program selected by the user is different from the ID of the received program, the program is not input to the content application execution unit 203, and thus, the program is not reproduced.

Note that, in the above description, a case where the server 30 distributes content with an ID to the base station 10 is described in an example. However, an ID assigned to content may also be assigned by the base station 10. In this case, the base station 10 may assign an ID to content by referring to the title information included in the content, for example. Furthermore, when the filtering unit 202 of the terminal apparatus 20 receives a MAC frame corresponding to an ID of content not utilized, the filtering unit 202 may stop processing for the content.

<2-2> Advantageous Effects of Second Embodiment

As described above, in the wireless system 1 according to the second embodiment, the base station 10 generates a program table including a list of a plurality of pieces of available content. The base station 10 distributes the program table and the plurality of pieces of content (programs) by multicast or broadcast applied with the extended broadcast data distribution setting. Next, regardless of whether the terminal apparatus 20 belongs to the base station 10, the content application selectively reproduces, from among the plurality of pieces of content displayed in the program table, content selected by the user. That is, in the wireless system 1 according to the second embodiment, similarly to the first embodiment, it is possible to omit processing of attributing the terminal apparatus 20 to the base station 10 and provide a plurality of pieces of content to the terminal apparatus 20.

Thus, for example, when a multilingual interpretation service for a lecture is provided as content distributed by wireless, the user can selectively utilize the interpretation service in a plurality of languages. As a result, similarly to the first embodiment, the wireless system 1 according to the second embodiment can improve the convenience for both the user and the service operator and improve the quality of the service provided by the service operator. Furthermore, in the wireless system 1 according to the second embodiment, the filtering unit 202 may stop processing on content not utilized to reduce power consumption of the terminal apparatus 20.

<3> Third Embodiment

The wireless system 1 according to a third embodiment has a configuration similar to that of the first embodiment and changes a type and the number of pieces of content distributed by extended broadcast data distribution, in accordance with a distribution condition. The wireless system 1 according to the third embodiment will be described with a focus on a difference from the first and second embodiments.

<3-1> Operation of Wireless System 1

In the wireless system 1 according to the third embodiment, the base station 10 distributes data by multicast. Furthermore, similarly to the second embodiment, the base station 10 generates a content set including a program table and a plurality of pieces of content. The base station 10 changes the type and the number of pieces of content to be distributed, in accordance with a request from the terminal apparatus 20.

Figure 16:
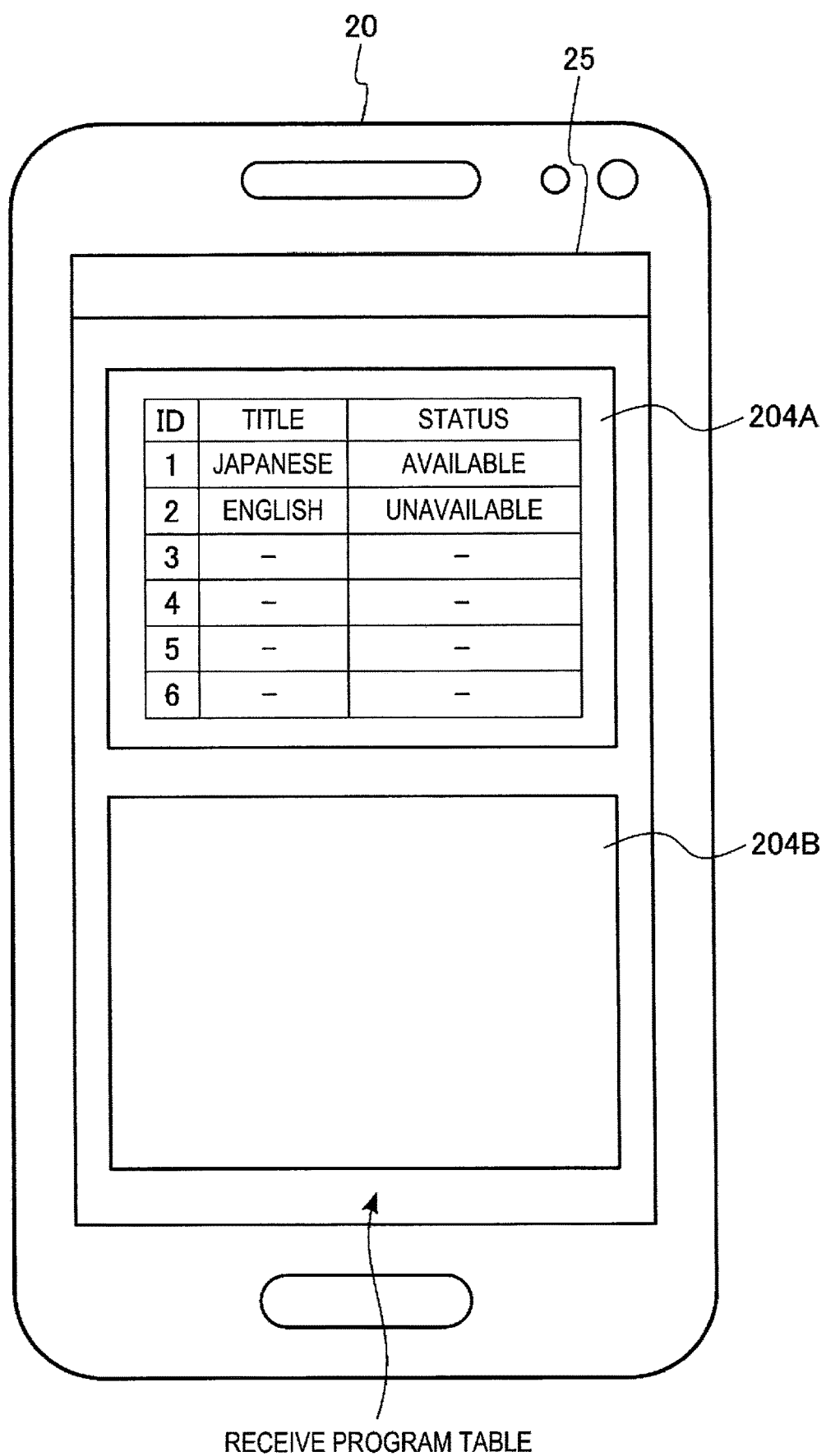
FIG. 16 is a conceptual diagram illustrating a specific example of an operation of a terminal apparatus included in a wireless system according to a third embodiment.

FIG. 16 illustrates an example of an operation when the terminal apparatus 20 executing the content application receives a program table, and the example is a specific example of an operation of the terminal apparatus 20 included in the wireless system 1 according to the third embodiment.

As illustrated in FIG. 16, similarly to the second embodiment, when the content application is executed, the content application execution unit 203 displays the GUI of the content application on the display 25. Next, when the terminal apparatus 20 receives the program table, the display unit 204A displays an ID, title information, and a distribution status corresponding to the content set being distributed. The distribution status indicates a distribution status of content that may be reproduced in the content application.

The distribution status of each ID is either "available" or "unavailable", for example. "Available" indicates that the base station 10 distributes the content corresponding to the ID. "Unavailable" indicates that the base station 10 stops distribution of the content corresponding to the ID.

Figure 17:
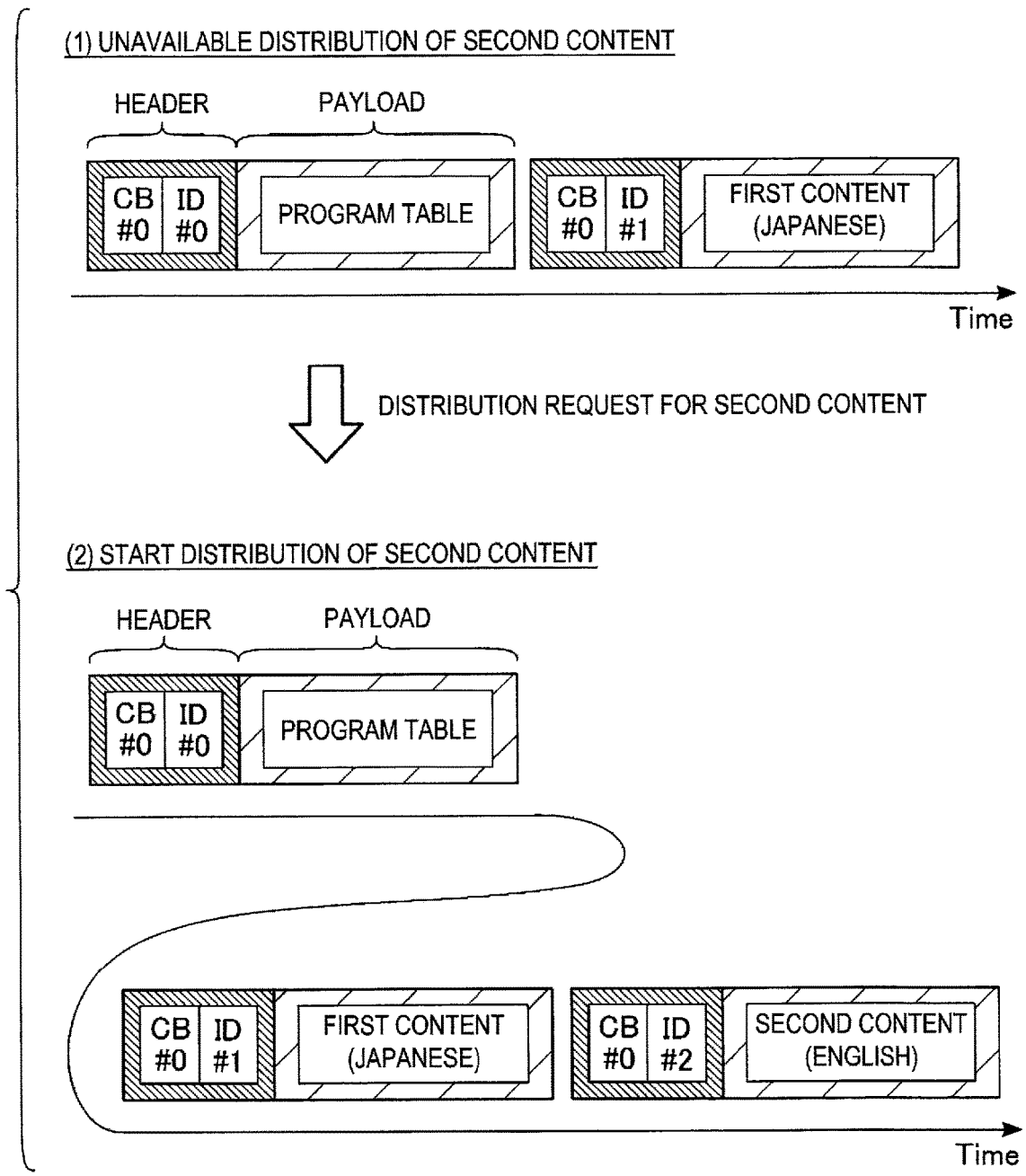
FIG. 17 is a conceptual diagram illustrating a specific example of an operation of a base station included in the wireless system according to the third embodiment.

FIG. 17 illustrates an example of a MAC frame distributed by the base station 10 included in the wireless system 1 according to the third embodiment. In the third embodiment, the base station 10 distributes the program table of the generated content set and content available in the content set, and does not distribute unavailable content.

The series of MAC frames illustrated in FIG. 17 (1) corresponds to the distribution status of the program table illustrated in FIG. 16. Specifically, the base station 10 distributes a MAC frame including the program table and a MAC frame including the first content (Japanese) to the terminal apparatus 20. Note that the configuration of the MAC frame distributed by the base station 10 is similar to that in the second embodiment.

Upon receiving a distribution request for unavailable content from the terminal apparatus 20, the base station 10 starts distribution of the unavailable content as illustrated in FIG. 17 (2). Specifically, the base station 10 distributes the MAC frame including the program table, the MAC frame including the first content (Japanese), and a MAC frame including the second content (English) to the terminal apparatus 20. Note that, after distribution of the second content is started, the distribution status of the program table is updated.

Figure 18:
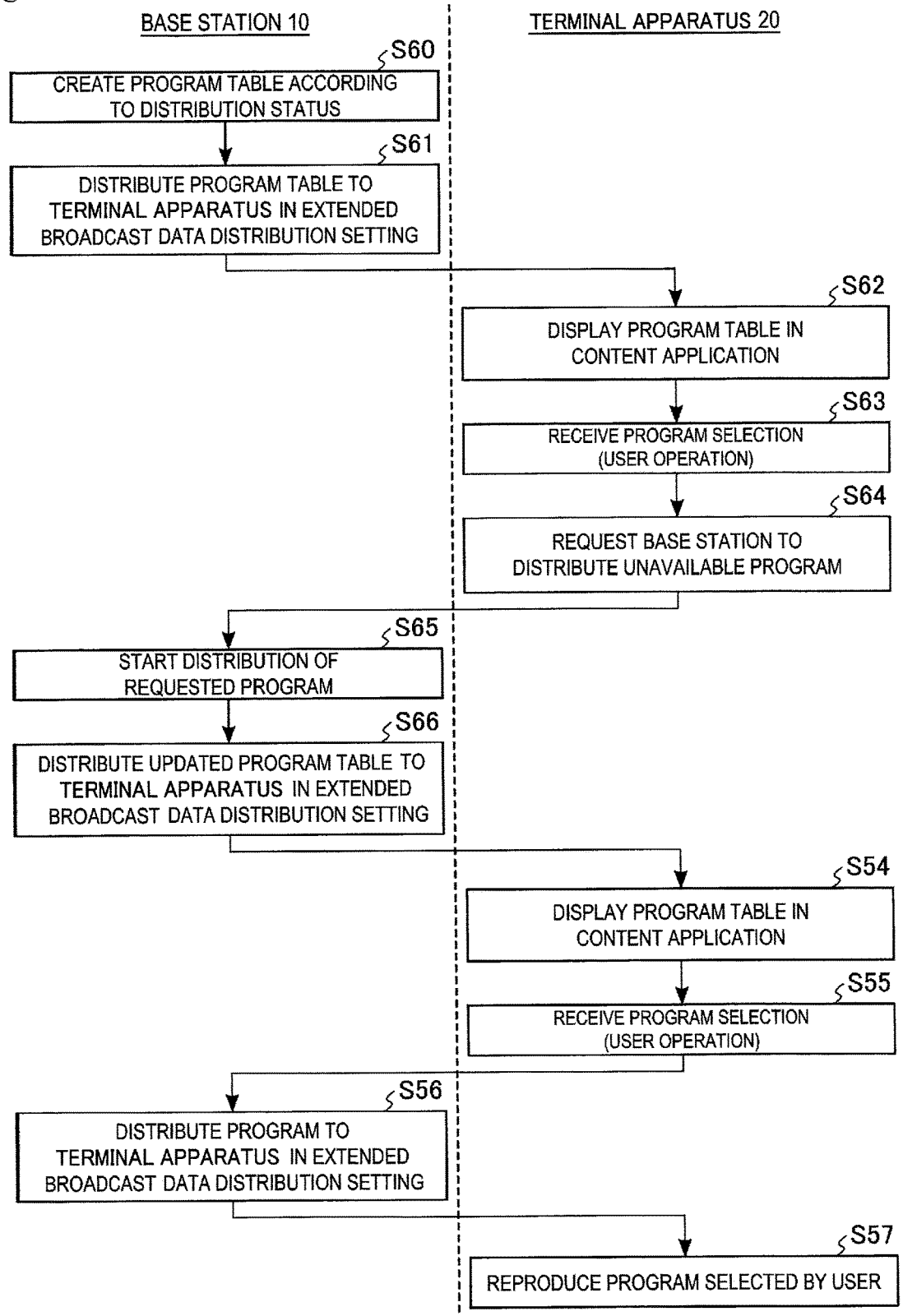
FIG. 18 is a flowchart illustrating an example of an operation of the wireless system according to the third embodiment.

FIG. 18 is a flowchart illustrating an example of an operation of the wireless system 1 according to the third embodiment, and corresponds to an operation after the base station 10 generates the content set. A specific example of an operation sequence of the wireless system 1 according to the third embodiment will be described below with reference to FIG. 18.

Firstly, the base station 10 generates a program table in accordance with the distribution status (step S60). This program table includes the distribution status of the content, as described above. The base station 10 distributes the program table to the terminal apparatus 20 in the extended broadcast data distribution setting (step S61).

Next, the terminal apparatus 20 receives the program table distributed from the base station 10 without belonging to the base station 10. As a result, the content application execution unit 203 displays the program table in the content application (step S62). After that, the content application comes into a state of receiving selection of a program (step S63).

When a program of which the distribution status is unavailable is selected, the terminal apparatus 20 requests the base station 10 to distribute the unavailable program (step S64). Specifically, the content application first detects a state where the unavailable content is selected by the user. As a result, the content application execution unit 203 requests the association processing unit 206 to start a procedure for attributing the terminal apparatus 20 to the base station 10. After that, a wireless connection is established between the terminal apparatus 20 and the base station 10, based on a normal procedure. Next, the content application execution unit 203 requests, for example, the filtering unit 202 to distribute the content selected by the user. As a result, the filtering unit 202 generates a signal (ID information) including an ID of the content for which distribution is requested, and the wireless signal processing unit 201 transmits the signal to the base station 10.

Upon receiving the distribution request for the program from the terminal apparatus 20, the base station 10 starts distribution of the requested program (content) (step S65). Specifically, the distribution request for the program is input to the broadcast data generation unit 102. Next, in response to receiving the distribution request, the broadcast data generation unit 102 starts distribution of a program corresponding to a specified ID. The base station 10 distributes an updated program table to the terminal apparatus 20 in the extended broadcast data distribution setting (step S66).

After that, the processing of steps S54 to S57 described in the second embodiment is sequentially executed. Other operations of the wireless system 1 according to the third embodiment are similar to those of the second embodiment.

Note that the broadcast data generation unit 102 of the base station 10 may monitor whether the terminal apparatus 20 receiving each program being distributed is present. The broadcast data generation unit 102 may stop distribution of a program not received by the terminal apparatus 20 among a plurality of pieces of content being distributed. In order to monitor a status in which the plurality of terminal apparatuses 20 receive programs, for example, the filtering unit 202 of each of the terminal apparatuses 20 may periodically notify the base station 10 of the ID of a program being received. The terminal apparatus 20 may notify the base station 10 of the ID of a program being received, in response to a request of the base station 10. For example, in a method by which the base station 10 transmits the request to the terminal apparatus 20, the MAC frame including the program table may include a trigger signal indicating whether the request is made.

<3-2> Advantageous Effects of Third Embodiment

As described above, in the wireless system 1 according to the third embodiment, the base station 10 may stop distribution of content not utilized by a user, in a generated content set. The base station 10 distributes a program table including the distribution status and a plurality of pieces of content by multicast. That is, the base station 10 notifies the user of the distribution status of the content via the program table.

When the distributed content is selected by the user, the terminal apparatus 20 reproduces the content, as in the second embodiment. When content of which distribution is unavailable is selected by the user, the terminal apparatus 20 requests the base station 10 to distribute the content. Based on the request received from the terminal apparatus 20, the base station 10 starts distribution of the content, and distributes a program table updated to the current distribution status.

Thus, in the wireless system 1 according to the third embodiment, similarly to the second embodiment, the user may use the content application of the terminal apparatus 20 to selectively reproduce a plurality of pieces of content. Consequently, similarly to the second embodiment, the wireless system 1 according to the third embodiment can improve the convenience for both the user and the service operator and improve the quality of the service provided by the service operator. Furthermore, in the wireless system 1 according to the third embodiment, the base station 10 can selectively stop distribution of content in accordance with a usage status of a user, and thus, power consumption can be reduced.

<4> Modifications

In each embodiment, the interpretation service described in a usage example of the wireless system 1 is merely an example. The wireless system 1 may be applied to any service as long as the service utilizes at least extended broadcast data distribution. For example, in each of the first to third embodiments, the content of extended broadcast data distribution may be audio, moving images including audio and images, or the like. When the content of the extended broadcast data distribution is audio, display of the content on the display unit 204 may be omitted. When the content of the extended broadcast data distribution is audio, the content application reproduces the audio content by using, for example, a speaker built in or connected to the terminal apparatus 20. Such a speaker and display may each be referred to as an output unit.

In each embodiment, a case where the MAC frame corresponding to the extended broadcast data distribution is unencrypted is described in an example, but the MAC frame corresponding to the extended broadcast data distribution may also be encrypted. For example, the content application may have an encryption key for decoding an encrypted MAC frame. In this case, the user can utilize a service of the service operator by the terminal apparatus 20 executing a content application associated with the distributed content.

In each of the first and second embodiments, broadcast or multicast is used for communication between the base station 10 and the terminal apparatus 20, and in the third embodiment, a case where multicast is used for the communication between the base station 10 and the terminal apparatus 20 is described in an example, but the present invention is not limited to these use of broadcast and multicast. In each of the first to third embodiments, unicast may be used for communication between the base station 10 and the terminal apparatus 20.

The configuration of the wireless system 1 according to the first embodiment is merely an example, and other configurations may be employed for the wireless system 1. For example, the terminal apparatus 20 may include an input interface other than the display 25, such as a keyboard and a mouse. Furthermore, the terminal apparatus 20 may not include the display 25 and the storage 26. In this case, for the terminal apparatus 20, the display 25 and the storage 26 are connected to the outside, for example. Thus, each of the base station 10, the terminal apparatus 20, and the server 30 may utilize a device connected to the outside. The processing in the broadcast data generation unit 102 may be executed by the data processing unit 101. The base station 10 may have a function of the server 30. In this case, the connection between the base station 10 and the network NW may be omitted, and the base station 10 includes a storage for storing content to be distributed to the terminal apparatus 20.

The functional configurations of the base station 10 and the terminal apparatus 20 in the wireless system 1 according to the first embodiment are merely examples. The functional configurations of the base station 10 and the terminal apparatus 20 may have other names and may be grouped differently as long as it is possible to execute the operations described in the first to third embodiments. For example, in the base station 10, the data processing unit 101, the broadcast data generation unit 102, the association processing unit 104, and the authentication processing unit 105 may be collectively referred to as a data processing unit. Similarly, in the terminal apparatus 20, the filtering unit 202, the association processing unit 206, and the authentication processing unit 207 may be collectively referred to as a data processing unit.

In the wireless system 1 according to the first embodiment, the CPU included in each of the base station 10, the terminal apparatus 20, and the server 30 may be realized by another circuit. For example, instead of the CPU, a micro processing unit (MPU) or the like may be used. Furthermore, each processing described in the embodiments may be realized by dedicated hardware. In the wireless system 1 according to each embodiment, processing executed by software and processing executed by hardware may be mixed, or either processing executed by software or processing executed by hardware may be executed.

In each embodiment, the flowchart used to describe an operation is merely an example. For example, in the second embodiment, after generating the content set, the base station 10 repeatedly distributes a set of the program table and the program. In the wireless system 1 according to the second embodiment, it is suffices that a program is selected by the terminal apparatus 20 during a period when the set of the program table and the program is repeatedly distributed, and the content application reproduces the program selected during the period.

The term "connection" as used herein corresponds to a state where data communication is possible. The term "connection request" corresponds to an operation in which the terminal apparatus 20 requests connection with the base station 10 in order to communicate with the network NW. Each of the terms "association" and "authentication" corresponds to processing for attributing the terminal apparatus 20 to the base station 10. Data distributed by extended broadcast data distribution may be referred to as extended broadcast data.

Although several embodiments of the present invention have been described, these embodiments are presented in the examples and are not intended to limit the scope of the invention. These novel embodiments can be implemented in various other aspects, and various types of omissions, substitutions, and changes can be made without departing from the gist of the present invention. The embodiments or modifications of the embodiments are included in the scope or gist of the invention, and are also included in the scope of the invention defined in the claims and the equivalent scope thereof.

REFERENCE SIGNS LIST

1 . . . Wireless system
10 . . . Base station
11 . . . CPU
12 . . . ROM
13 . . . RAM
14 . . . Wireless communication module
15 . . . Wired communication module
20 . . . Terminal apparatus
21 . . . CPU
22 . . . ROM
23 . . . RAM
24 . . . Wireless communication module
25 . . . Display
26 . . . Storage
30 . . . Server
31 . . . CPU
32 . . . ROM
33 . . . RAM
34 . . . Wired communication module
35 . . . Storage
36 . . . Content
101 . . . Data processing unit
102 . . . Broadcast data generation unit
103 . . . Wireless signal processing unit
104 . . . Association processing unit
105 . . . Authentication processing unit
201 . . . Wireless signal processing unit
202 . . . Filtering unit
203 . . . Content application execution unit
204 . . . Display unit
205 . . . Input unit

The invention claimed is:

1. A base station, comprising:
a data processing circuit configured to generate a first MAC frame including input data and an identification bit indicating that the input data is extended broadcast data; and
a wireless signal processing circuit configured to convert the first MAC frame into a first wireless signal to distribute the first wireless signal, wherein
the data processing circuit is configured to:
generate a table including title information of content; and
generate a second MAC frame including the identification bit and the table, and
the wireless signal processing circuit is configured to convert the second MAC frame into a second wireless signal to distribute the second wireless signal.

2. The base station according to claim 1, wherein
the data processing circuit, after generating the table, is configured to:
generate a third MAC frame including the identification bit, first content, and a bit for identifying the first content; and
generate a fourth MAC frame including the identification bit, second content, and a bit for identifying the second content, and
the wireless signal processing circuit is configured to convert at least one of the third MAC frame and the fourth MAC frame into a third wireless signal to distribute the third wireless signal.

3. The base station according to claim 2, wherein
the wireless signal processing circuit is configured to convert, in response to a request from a terminal apparatus, a requested MAC frame among the third MAC frame and the fourth MAC frame into a fourth wireless signal to distribute the fourth wireless signal.

4. A terminal apparatus, comprising:
a wireless signal processing circuit configured to receive a wireless signal from a base station and acquire, from the wireless signal, a MAC frame including data and an identification bit indicating that the data is extended broadcast data;
a data processing circuit configured to output the data included in the MAC frame to a higher layer based on the identification bit,
an application execution circuit configured to reproduce an input content; and
an output circuit configured to output the content as at least one of an image and audio, wherein
the content is included in the data,
the data processing circuit is configured to output the content included in the MAC frame including the identification bit to the application execution circuit, and the application execution circuit reproduces the content by using the output circuit,
the MAC frame further includes ID information for identifying the content,
the data processing circuit is configured to identify a plurality of pieces of content including first and second content based on the ID information, and output the first content selected by a user to the application execution circuit, and
when the second content having a distribution status of unavailable is selected by the user, the data processing circuit temporarily attributes the terminal apparatus to the base station, and generates the ID information for requesting the base station to distribute the second content having the distribution status of unavailable.

5. The terminal apparatus according to claim 4, wherein
when a table including title information of the plurality of pieces of content is input to the data processing circuit, the application execution circuit displays the table on a display.

* * * * *